US012456822B2

(12) United States Patent
Franzini et al.

(10) Patent No.: US 12,456,822 B2
(45) Date of Patent: *Oct. 28, 2025

(54) LOW-PROFILE WIDEBAND ANTENNA ARRAY CONFIGURED TO UTILIZE EFFICIENT MANUFACTURING PROCESSES

(71) Applicant: The MITRE Corporation, McLean, VA (US)

(72) Inventors: Cecelia R. Franzini, Worcester, MA (US); Mohamed Wajih Elsallal, Acton, MA (US); Jamie R. Hood, Owatonna, MN (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,996

(22) Filed: Jun. 10, 2024

(65) Prior Publication Data

US 2024/0332818 A1    Oct. 3, 2024

Related U.S. Application Data

(63) Continuation of application No. 18/197,328, filed on May 15, 2023, now Pat. No. 12,051,854, which is a
(Continued)

(51) Int. Cl.
   *H01Q 1/12*    (2006.01)
   *B22F 10/00*   (2021.01)
   (Continued)

(52) U.S. Cl.
   CPC ......... *H01Q 21/0087* (2013.01); *B22F 10/00* (2021.01); *B22F 10/28* (2021.01);
   (Continued)

(58) Field of Classification Search
   CPC .... H01Q 21/0087; H01Q 1/12; H01Q 1/1207; H01Q 3/26; H01Q 3/2652; H01Q 5/328;
   (Continued)

(56) References Cited

U.S. PATENT DOCUMENTS

| 4,574,331 A | 3/1986 | Smolley |
| 5,187,489 A | 2/1993 | Whelan et al. |

(Continued)

FOREIGN PATENT DOCUMENTS

| EP | 2629367 A1 | 8/2013 |
| KR | 10-2016-0072358 A | 6/2016 |

(Continued)

OTHER PUBLICATIONS

Boryssenko, Anatoliy et al., "Substrate Free G-Band Vivaldi Antenna Array Design, Fabrication and Testing," 39th International Conference on Infrared, Millimeter, and Terahertz Waves (IRMMW-THz), Sep. 2014, 2 pages.

(Continued)

*Primary Examiner* — Hai V Tran
(74) *Attorney, Agent, or Firm* — Morrison & Foerster LLP

(57) ABSTRACT

A low profile phased array antenna that is configured to be manufactured using additive manufacturing techniques is provided. In one or more embodiments, the phased array can include a plurality of signal ears, ground ears, and clustered pillars that can be arranged in relation to a base plate such that each component of the antenna can be manufactured from a single piece of material, thereby allowing for the use of additive manufacturing techniques which can substantially reduce the cost and time of the manufacturing process. The phased array can include a signal ear that include one or more posts that interface with an airgap located within a base plate of the array, wherein the size of the airgap in relation
(Continued)

to the size of the post is configured to achieve an optimal level of impedance matching.

27 Claims, 23 Drawing Sheets

Related U.S. Application Data continuation of application No. 17/113,639, filed on Dec. 7, 2020, now Pat. No. 11,670,868, which is a continuation of application No. 16/115,306, filed on Aug. 28, 2018, now Pat. No. 10,886,625.

(51) Int. Cl.
| | |
|---|---|
| *B22F 10/25* | (2021.01) |
| *B22F 10/28* | (2021.01) |
| *B29C 64/124* | (2017.01) |
| *B33Y 80/00* | (2015.01) |
| *H01Q 3/26* | (2006.01) |
| *H01Q 5/328* | (2015.01) |
| *H01Q 5/335* | (2015.01) |
| *H01Q 13/08* | (2006.01) |
| *H01Q 21/00* | (2006.01) |
| *H01Q 21/06* | (2006.01) |
| *H01Q 21/26* | (2006.01) |
| *H01Q 25/00* | (2006.01) |
| *B29L 31/34* | (2006.01) |
| *B33Y 10/00* | (2015.01) |

(52) U.S. Cl.
CPC ............ *B29C 64/124* (2017.08); *B33Y 80/00* (2014.12); *H01Q 1/12* (2013.01); *H01Q 1/1207* (2013.01); *H01Q 3/26* (2013.01); *H01Q 3/2652* (2013.01); *H01Q 5/328* (2015.01); *H01Q 5/335* (2015.01); *H01Q 13/085* (2013.01); *H01Q 21/00* (2013.01); *H01Q 21/06* (2013.01); *H01Q 21/064* (2013.01); *H01Q 21/26* (2013.01); *H01Q 25/001* (2013.01); *B22F 10/25* (2021.01); *B29L 2031/3456* (2013.01); *B33Y 10/00* (2014.12)

(58) Field of Classification Search
CPC ...... H01Q 5/335; H01Q 13/085; H01Q 21/00; H01Q 21/06; H01Q 21/064; H01Q 21/26; H01Q 25/001; B22F 10/00; B22F 10/28; B29C 64/124; B33Y 80/00
See application file for complete search history.

(56) References Cited

U.S. PATENT DOCUMENTS

| | | | |
|---|---|---|---|
| 5,309,165 A * | 5/1994 | Segal | H01Q 13/10 343/770 |
| 5,557,291 A | 9/1996 | Chu et al. | |
| 5,845,391 A * | 12/1998 | Bellus | H01Q 21/0087 343/770 |
| 5,886,671 A | 3/1999 | Riemer et al. | |
| 5,923,289 A | 7/1999 | Buer et al. | |
| 5,945,897 A | 8/1999 | Pluymers et al. | |
| 5,982,250 A | 11/1999 | Hung et al. | |
| 6,020,848 A | 2/2000 | Wallace et al. | |
| 6,297,774 B1 | 10/2001 | Chung | |
| 6,300,906 B1 | 10/2001 | Rawnick et al. | |
| 6,424,313 B1 | 7/2002 | Navarro et al. | |
| 6,480,154 B1 | 11/2002 | Bella et al. | |
| 6,529,166 B2 | 3/2003 | Kanamaluru | |
| 6,531,976 B1 | 3/2003 | Yu | |
| 6,552,687 B1 | 4/2003 | Rawnick et al. | |
| 6,552,691 B2 | 4/2003 | Mohuchy et al. | |
| 6,758,681 B2 | 7/2004 | Johnson, Jr. | |
| 6,771,221 B2 | 8/2004 | Rawnick et al. | |
| 6,822,616 B2 | 11/2004 | Durham et al. | |
| 6,856,297 B1 | 2/2005 | Durham et al. | |
| 6,876,336 B2 | 4/2005 | Croswell et al. | |
| 7,009,570 B2 | 3/2006 | Durham et al. | |
| 7,034,753 B1 | 4/2006 | Elsallal et al. | |
| 7,088,300 B2 | 8/2006 | Fisher | |
| 7,109,939 B2 | 9/2006 | Lynch et al. | |
| 7,180,457 B2 | 2/2007 | Trott et al. | |
| 7,260,141 B2 | 8/2007 | Bierly et al. | |
| 7,369,083 B2 | 5/2008 | Budic | |
| 7,373,127 B2 | 5/2008 | Reed | |
| 7,385,914 B2 | 6/2008 | Choi et al. | |
| 7,394,424 B1 | 7/2008 | Jelinek et al. | |
| 7,403,169 B2 | 7/2008 | Svensson et al. | |
| 7,408,520 B2 | 8/2008 | Durham et al. | |
| 7,474,262 B2 | 1/2009 | Alland | |
| 7,714,782 B2 | 5/2010 | Davis et al. | |
| 7,760,142 B2 | 7/2010 | Sabet et al. | |
| 8,081,123 B2 | 12/2011 | Yang | |
| 8,154,469 B2 | 4/2012 | McKinley et al. | |
| 8,305,283 B2 | 11/2012 | Bourtoutian | |
| 8,325,093 B2 | 12/2012 | Holland et al. | |
| 8,350,773 B1 | 1/2013 | Kindt | |
| 8,405,564 B2 | 3/2013 | Kindt et al. | |
| 8,466,846 B1 * | 6/2013 | Elsallal | H01Q 1/38 343/770 |
| 8,482,475 B2 | 7/2013 | Tiezzi et al. | |
| 8,547,275 B2 | 10/2013 | Culkin et al. | |
| 8,643,554 B1 | 2/2014 | Manry, Jr. et al. | |
| 8,665,845 B2 | 3/2014 | O'Keeffe et al. | |
| 8,736,504 B1 | 5/2014 | West et al. | |
| 8,749,446 B2 | 6/2014 | Manry, Jr. et al. | |
| 8,754,810 B2 | 6/2014 | Guo et al. | |
| 8,847,836 B2 | 9/2014 | Yu et al. | |
| 8,872,719 B2 | 10/2014 | Warnick | |
| 8,941,540 B2 | 1/2015 | Harper et al. | |
| 8,947,312 B2 | 2/2015 | Brown et al. | |
| 8,988,278 B2 | 3/2015 | Lee et al. | |
| 9,000,996 B2 | 4/2015 | Holland et al. | |
| 9,054,427 B2 * | 6/2015 | Guy | H01Q 21/0087 |
| 9,070,972 B2 | 6/2015 | Wang et al. | |
| 9,190,727 B1 | 11/2015 | Urcia et al. | |
| 9,445,282 B2 | 9/2016 | Chen et al. | |
| 9,520,655 B2 | 12/2016 | Cerreno | |
| 9,912,072 B1 | 3/2018 | Mandeville et al. | |
| 10,854,993 B2 | 12/2020 | Franzini et al. | |
| 11,088,465 B2 | 8/2021 | Elsallal | |
| 12,003,030 B2 | 6/2024 | Franzini et al. | |
| 2005/0035915 A1 | 2/2005 | Livingston et al. | |
| 2008/0012710 A1 | 1/2008 | Sadr | |
| 2008/0211726 A1 | 9/2008 | Elsallal et al. | |
| 2009/0239551 A1 | 9/2009 | Woodsum | |
| 2010/0007572 A1 | 1/2010 | Jones et al. | |
| 2010/0154250 A1 | 6/2010 | Bae et al. | |
| 2010/0277385 A1 | 11/2010 | Lewis et al. | |
| 2011/0057852 A1 | 3/2011 | Holland et al. | |
| 2012/0025370 A1 | 2/2012 | Wholey et al. | |
| 2012/0194406 A1 | 8/2012 | Brown et al. | |
| 2013/0016003 A1 | 1/2013 | Stirling-Gallacher et al. | |
| 2013/0207878 A1 | 8/2013 | Mital et al. | |
| 2013/0342397 A1 | 12/2013 | Turbiner | |
| 2014/0138546 A1 | 5/2014 | Iluz et al. | |
| 2014/0152510 A1 | 6/2014 | Manry, Jr. et al. | |
| 2014/0266897 A1 | 9/2014 | Jakoby et al. | |
| 2014/0327576 A1 | 11/2014 | Kumar | |
| 2015/0295309 A1 | 10/2015 | Manry, Jr. et al. | |
| 2015/0364819 A1 | 12/2015 | Ngo et al. | |
| 2016/0087111 A1 | 3/2016 | Toonen et al. | |
| 2016/0164587 A1 | 6/2016 | Pu et al. | |
| 2016/0241323 A1 | 8/2016 | Ko et al. | |
| 2017/0025767 A1 | 1/2017 | Elsallal et al. | |
| 2017/0237177 A1 | 8/2017 | Kirino et al. | |
| 2017/0256859 A1 | 9/2017 | Boryssenko et al. | |
| 2017/0302003 A1 | 10/2017 | Elsallal et al. | |
| 2018/0269592 A1 | 9/2018 | Elsallal et al. | |
| 2018/0269593 A1 | 9/2018 | Elsallal et al. | |

(56) References Cited

U.S. PATENT DOCUMENTS

| | | |
|---|---|---|
| 2018/0366836 A1 | 12/2018 | Elsallal et al. |
| 2018/0375217 A1 | 12/2018 | Elsallal et al. |
| 2019/0089068 A1 | 3/2019 | Franzini et al. |
| 2020/0212041 A1 | 7/2020 | Machkaoutsan et al. |
| 2021/0028557 A1 | 1/2021 | Franzini |
| 2021/0036736 A1 | 2/2021 | Uchimura et al. |
| 2021/0376484 A1 | 12/2021 | Elsallal et al. |
| 2024/0322454 A1 | 9/2024 | Franzini |

FOREIGN PATENT DOCUMENTS

| | | |
|---|---|---|
| WO | 1999/34477 A1 | 7/1999 |
| WO | 2001/89030 A1 | 11/2001 |
| WO | 2015/019100 A1 | 2/2015 |
| WO | 2015/104728 A1 | 7/2015 |

OTHER PUBLICATIONS

Elsallal et al. U.S. Office Action dated Oct. 26, 2017, directed to U.S. Appl. No. 14/544,935; 7 pages.

Elsallal et al. U.S. Office Action mailed Sep. 8, 2017, directed to U.S. Appl. No. 14/544,934; 6 pages.

Elsallal et al., U.S. Office Action dated Jul. 13, 2018, directed to U.S. Appl. No. 15/986,464; 6 pages.

Elsallal et al., U.S. Office Action dated Jul. 17, 2018, directed to U.S. Appl. No. 15/986,413; 9 pages.

Elsallal et al., U.S. Office Action dated Jun. 18, 2020 directed to U.S. Appl. No. 16/057,709; 8 pages.

Elsallal et al., U.S. Office Action dated Jun. 19, 2020 directed to U.S. Appl. No. 16/057,672; 9 pages.

Elsallal et al., U.S. Office Action dated Nov. 15, 2024 directed to U.S. Appl. No. 17/397,519; 11 pages.

Elsallal et al., U.S. Office Action dated Nov. 17, 2020 directed to U.S. Appl. No. 16/057,672; 9 pages.

Elsallal et al., U.S. Office Action dated Nov. 18, 2020 directed to U.S. Appl. No. 16/057,709; 8 pages.

Fenn, Alan J. et al., "The Development of Phased-Array Radar Technology," Lincoln Laboratory Journal, vol. 12, No. 2, (2000), pp. 321-340.

Franzini et al., U.S. Office Action dated Aug. 17, 2022, directed to U.S. Appl. No. 17/113,639; 13 pages.

Franzini et al., U.S. Office Action dated Feb. 21, 2020, directed to U.S. Appl. No. 15/708,035; 9 pages.

Franzini et al., U.S. Office Action dated Mar. 18, 2020, directed to U.S. Appl. No. 16/115,306; 18 pages.

Franzini et al., U.S. Office Action dated Oct. 29, 2019, directed to U.S. Appl. No. 15/708,035; 30 pages.

Galli, A. et al., "Novel Printed UWB Array Based on a Versatile and Low-Cost Antenna Configuration," 6th European Conference on Antennas and Propagation, IEEE, 2011, pp. 626-628.

Holland, Steven S. et al., "A 7-21 GHz Dual-Polarized Planar Ultrawideband Modular Antenna (PUMA) Array," IEEE Transactions on Antennas and Propagation, vol. 60, No. 10, Oct. 2012, pp. 4589-4600.

International Preliminary Report on Patentability dated Mar. 24, 2020, directed to International Application No. PCT/US2018/051591; 9 pages.

International Search Report and Written Opinion mailed Dec. 14, 2018, directed to PCT Application No. PCT/US2018/051591; 16 pages.

Jamil, K. et al. (2012) "A Multi-Band Multi-Beam Software-Defined Passive Radar Part I: System Design," IET International Conference on Radar Systems (Radar 2012); 5 pages.

Moulder, William F. et al., "Ultrawideband Superstrate-Enhanced Substrate-Loaded Array With Integrated Feed," IEEE Transactions on Antennas and Propagation, vol. 61, No. 11, Nov. 2013, pp. 5802-5807.

Odile, Adrian (2008) "From AESA radar to digital radar for surface applications," IET, Waveform Diversity & Digital Radar Conference—Day 2: From Active Modules to Digital Radar, retrieved at http://ieeexplore.ieee.org/document/4782200/?arnumber=4782200, abstract only; 1 page.

Shen, W. et al., "Study on Asymmetric Tapered Slotline Antenna," IEEE 2006, pp. 156-158.

Tallini, D. et al., "A New Low-Profile Wide-Scan Phased Array for UWB Applications," 2007; 5 pages.

Volakis, John L. et al. (2014) "Ultra-wideband conformal apertures with digital beamforming for UHF to millimeter-wave applications," IEEE International Workshop on Antenna Technology: Small Antennas, Novel EM Structures and Materials, and Applications (IWAT); retrieved at http://Ieeexplore.ieee.org/document/6958622, abstract only; 1 page.

Yao, Yuan et al. (2008) "Ultra-wideband Antenna Array Using Novel Asymmetric Tapered Slot Radiator," IEEE; 4 pages.

Yi, Huan et al. "3-D Printed Discrete Dielectric Lens Antenna with Matching Layer," Proceedings of ISAP 2014, Kaohsiung, Taiwan, Dec. 2, 2014, pp. 115-116.

Zhao, Yun et al., (2014) "Wideband and Low-Profile H-Plane Ridged SIW Horn Antenna Mounted on a Large Conducting Plane," IEEE Transactions on Antennas and Propagation vol. 62, Issue 11, retrieved at http://ieeexplore.ieee.org/document/6891293, abstract only; 1 page.

Franzini et al., U.S. Office Action dated Mar. 18, 2025, directed to U.S. Appl. No. 18/732,275; 9 pages.

* cited by examiner

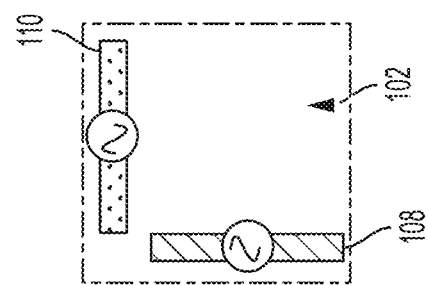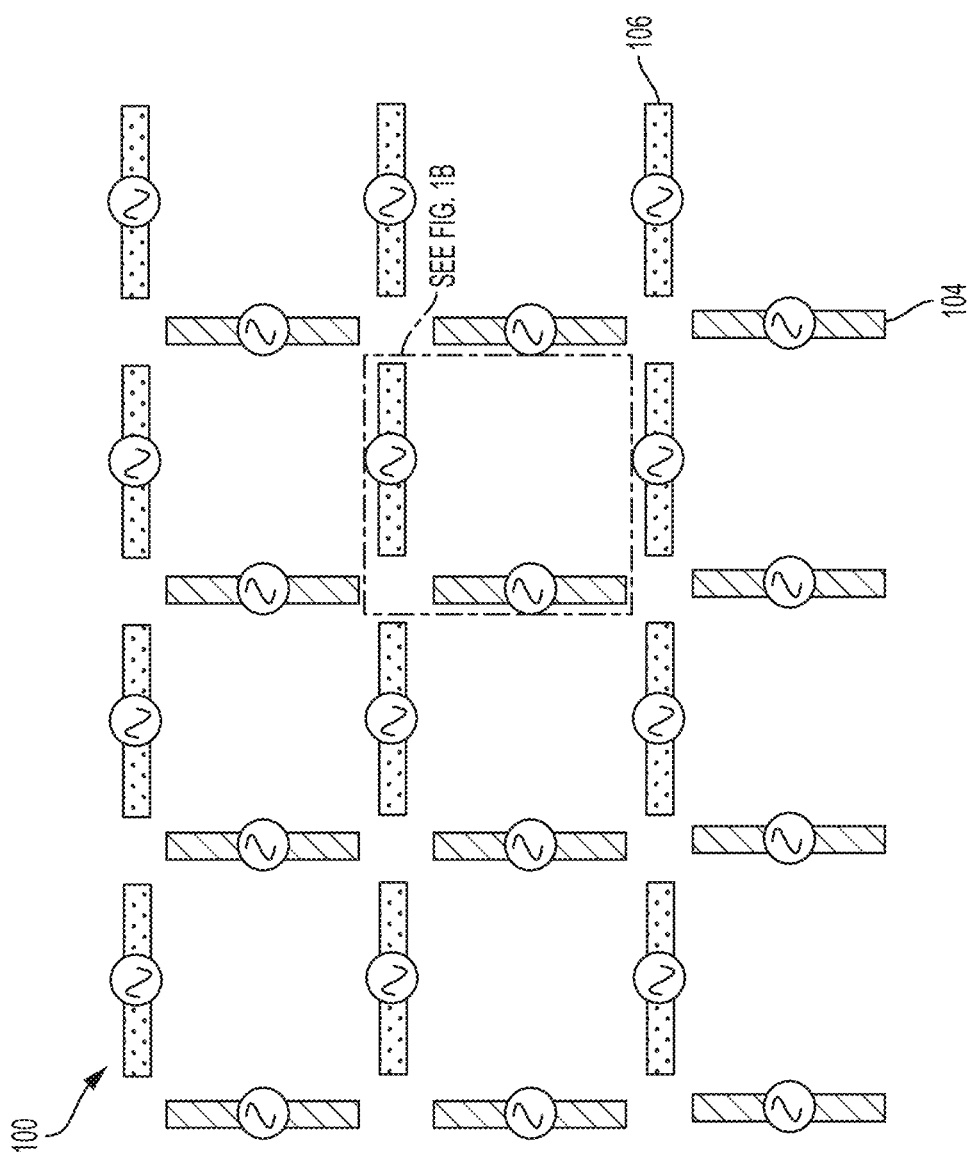

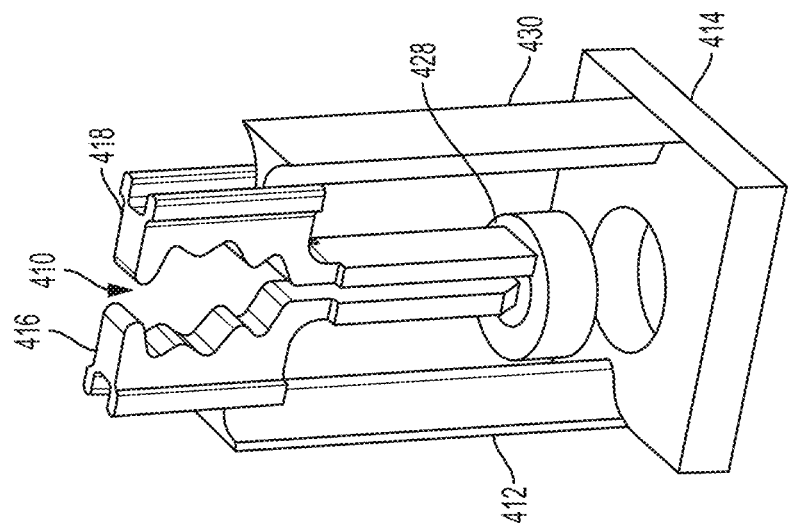
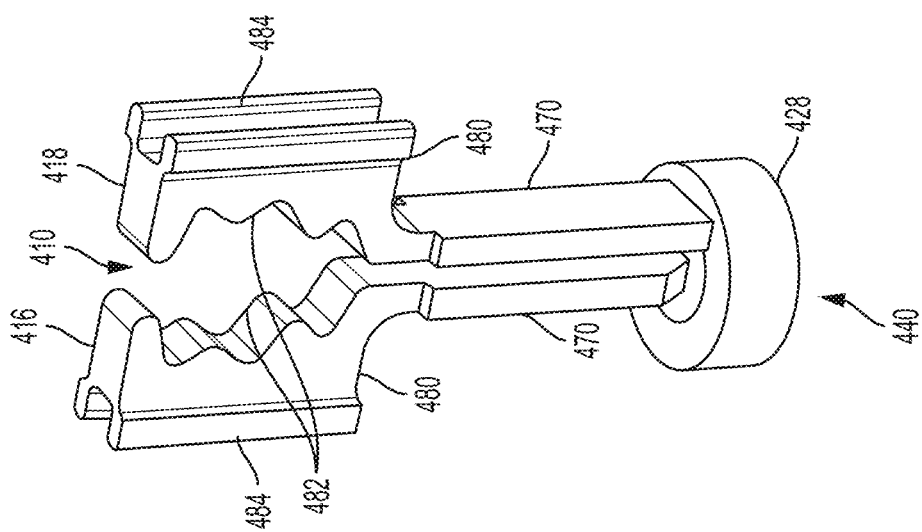

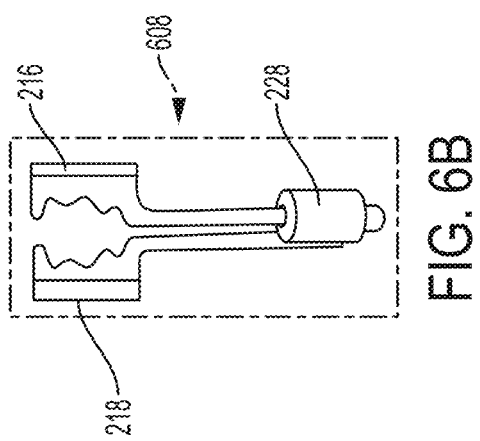
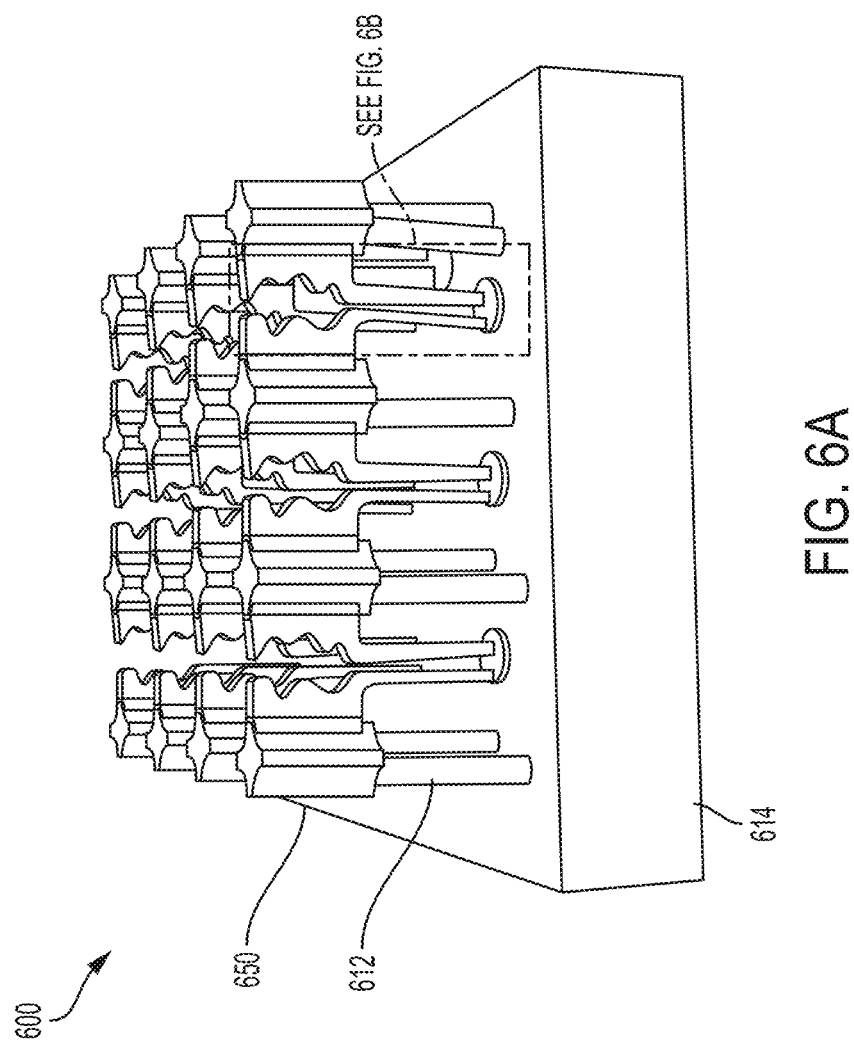

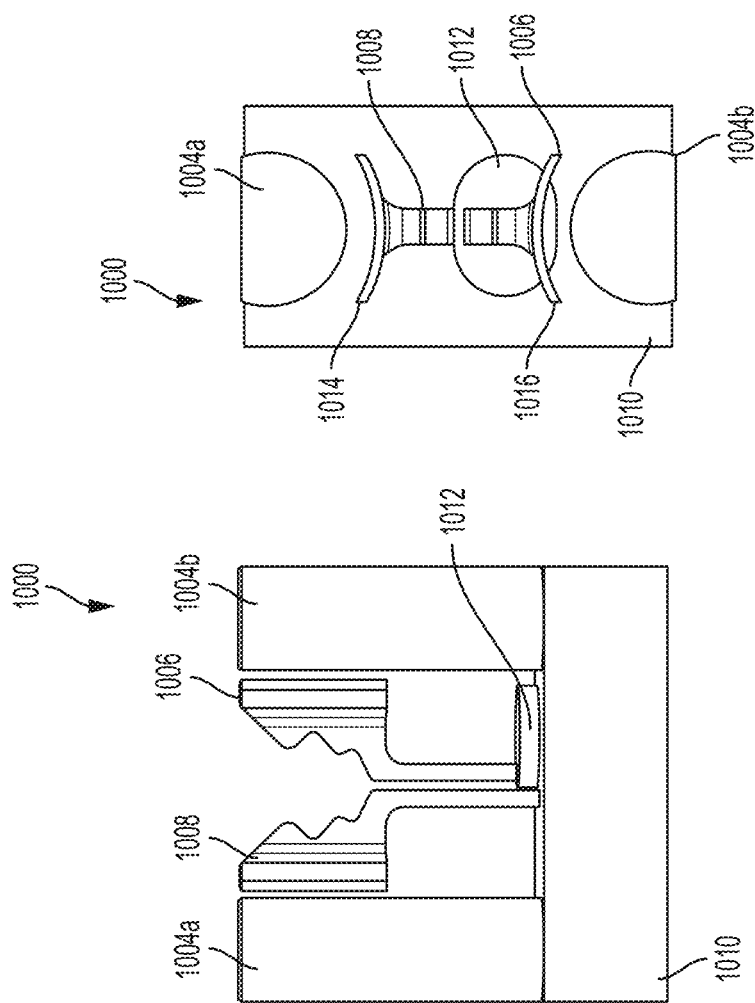
FIG. 10C
FIG. 10B
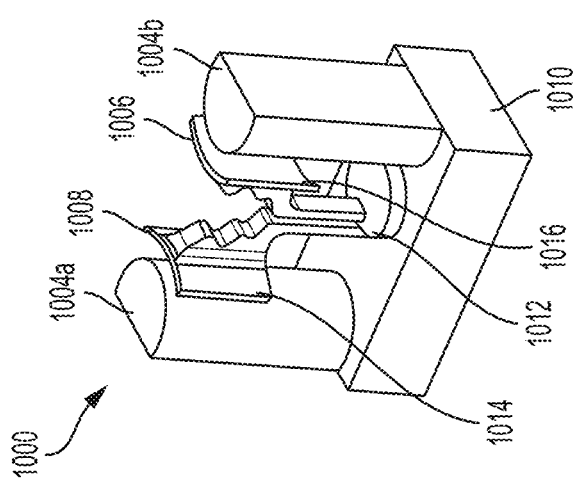
FIG. 10A

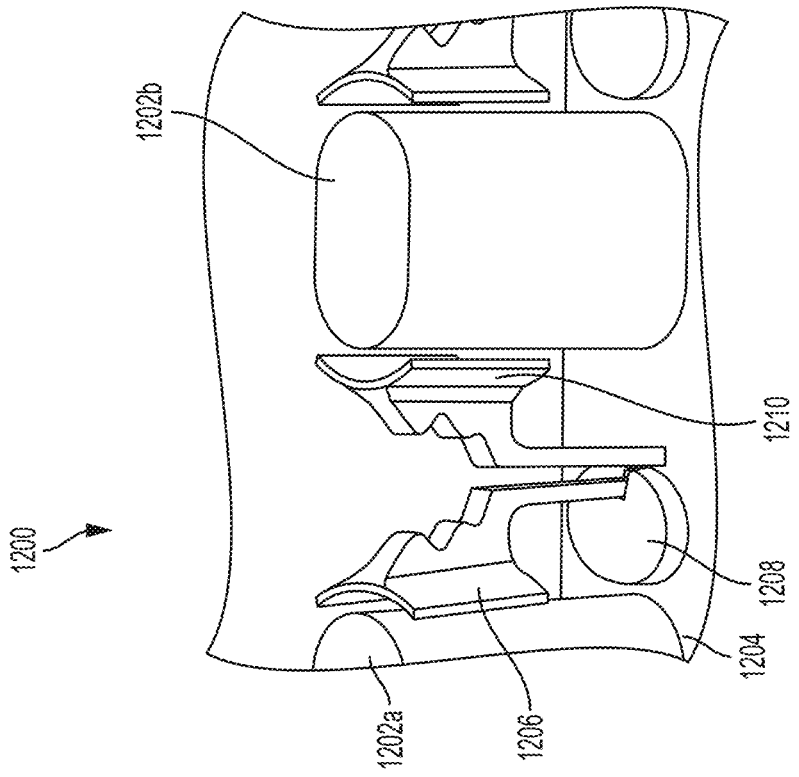
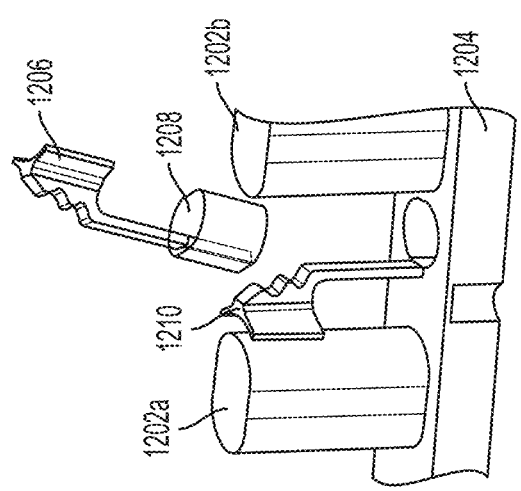
FIG. 12B
FIG. 12A

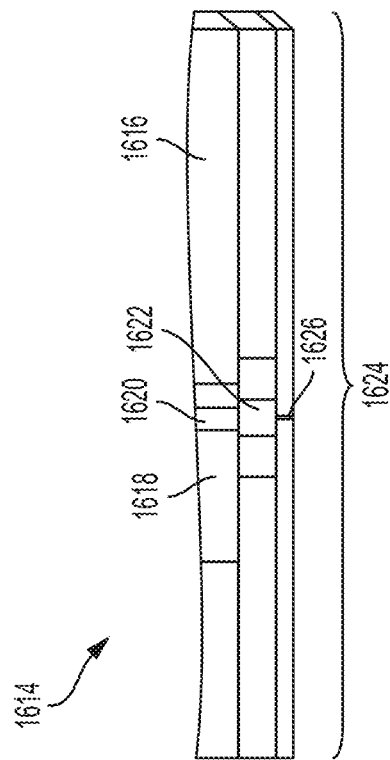
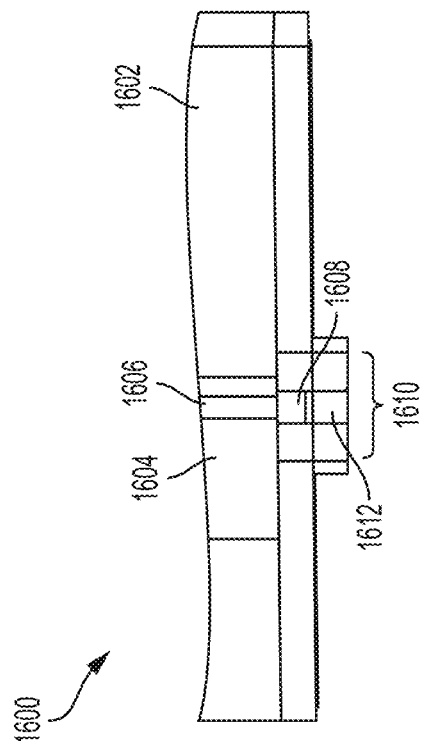

LOW-PROFILE WIDEBAND ANTENNA ARRAY CONFIGURED TO UTILIZE EFFICIENT MANUFACTURING PROCESSES

CROSS-REFERENCE TO RELATED APPLICATIONS

This application is a continuation of U.S. application Ser. No. 18/197,328, filed May 15, 2023, which is a continuation of U.S. application Ser. No. 17/113,639, filed Dec. 7, 2020, which is a continuation of U.S. application Ser. No. 16/115,306, filed Aug. 28, 2018, the entire contents of each of which are incorporated herein by reference.

FIELD OF THE DISCLOSURE

The present disclosure relates generally to antennas, and more specifically to antenna arrays that are specifically configured to utilize low-cost and efficient manufacturing processes to produce ultra-wideband, multi-band, phased array or electronically scanned array antennas.

BACKGROUND OF THE DISCLOSURE

There are increasing demands to develop a wideband phased array or electronically scanned array (ESA) that include a wide variety of configurations for various applications, such as satellite communications (SATCOM), radar, remote sensing, direction finding, and other systems. The goal is to provide more flexibility and functionality at reduced cost with consideration to limited space, weight, and power consumption (SWaP) on modern military and commercial platforms. This requires advances in ESA and manufacturing technologies.

A phased array antenna is an array of antenna elements in which the phases of respective signals feeding the antenna elements are set in such a way that the effective radiation pattern of the array is reinforced in a desired direction and suppressed in undesired directions, thus forming a beam. The relative amplitudes of constructive and destructive interference effects among the signals radiated by the individual elements determine the effective radiation pattern of the phased array. The number of antenna elements in a phased array antenna is often dependent on the required gain of a particular application and can range from isotropic to highly directive levels.

Phased array antennas for ultra-wide bandwidth (more than one octave bandwidth) performance are often large, causing excessive size, weight, and cost for applications requiring many elements. The excessive size of an array may be required to accommodate "electrically large" radiating elements (several wavelengths in length), increasing the total depth of the array. Arrays may also be large due to the nesting of several multi-band elements to enable instantaneous ultra-wide bandwidth performance, which increases the total length and width of the array.

Because arrays are often large and include many individual elements, the process for manufacturing an antenna array can be expensive and require a great deal of time and labor. Traditionally, antenna arrays are created using multiple components that are often made from different types of materials thus requiring that each individual component be manufactured separately. Once each component has been manufactured separately, the components have to be assembled in a specific configuration to build the array. The assembly process itself can be time consuming and arduous.

An antenna array that can limit the number of different materials required to manufacture the components thus being able to utilize a low-cost and efficient manufacturing process would substantially lower the cost, labor, and time required to create complex antenna arrays.

SUMMARY OF THE DISCLOSURE

A phased array antenna that is configured to allow for substantially each and every component of the phased array to be manufactured using metal or another material that can be conductively plated is provided. The phased array can include a plurality of signal ears, ground ears, and clustered pillars that can be arranged in relation to a base plate such that each component of the antenna can be manufactured from a single piece of material, thereby allowing for the use of additive manufacturing techniques which can substantially reduce the cost and time of the manufacturing process. The phased array can include a signal ear that include one or more posts that interface with an airgap located within a base plate of the array, wherein the size of the airgap in relation to the size of the post is configured to achieve an optimal level of impedance matching.

In additional embodiments, the phased array can be further improved by being configured to include a clustered pillar to promote electromagnetic coupling between adjacent elements of the phase array. The shape of the clustered pillar can be configured to allow for increased coupling between adjacent elements, thereby allowing for a relaxed lattice spacing in the array. In additional embodiments, the radiating elements can be configured such that the mutual coupling between adjacent elements is sufficiently strong so as to not require a clustered pillar.

In additional embodiments, the phased array antenna can be further improved by designing the elements of the phased array to mate with a coaxial cable and PCB circuit thereby providing more flexibility to test the aperture using only coaxial cables or to excite the entire array using a PCB combiner. In some embodiments, the phased array can also be improved by providing the elements of the phased array to mate with a plurality of Subminiature Version A (SMA) connectors.

BRIEF DESCRIPTION OF THE FIGURES

FIG. 1A illustrates a plan view of a general dual-polarized phased array antenna according to examples of the disclosure.

FIG. 1B is a unit cell of a general dual-polarized phased array antenna according to examples of the disclosure.

FIG. 4A is an isometric view of a radiating element of a phased array antenna according to examples of the disclosure.

FIG. 4B is an isometric view of a unit cell of a single-polarized assembly of a phased array antenna according to examples of the disclosure.

FIG. 6A is a three-dimensional view of a dual-polarized phased array antenna according to examples of the disclosure.

FIG. 6B is a three-dimensional view of a radiating element of a phased array antenna according to examples of the disclosure.

FIGS. 10A-C illustrate a phased array with relaxed lattice spacing that utilizes the radiating element of FIG. 9 according to examples of the disclosure.

FIGS. 12A-B illustrates an element and base plate of the phased array configured to be mated with an elastomeric gasket that delivers signal and ground to a coaxial connector or PCB according to examples of the disclosure.

FIGS. 16A-B illustrates an exemplary RF interconnect with PCB or a coaxial cable.

DETAILED DESCRIPTION OF THE DISCLOSURE

Figure 2C:
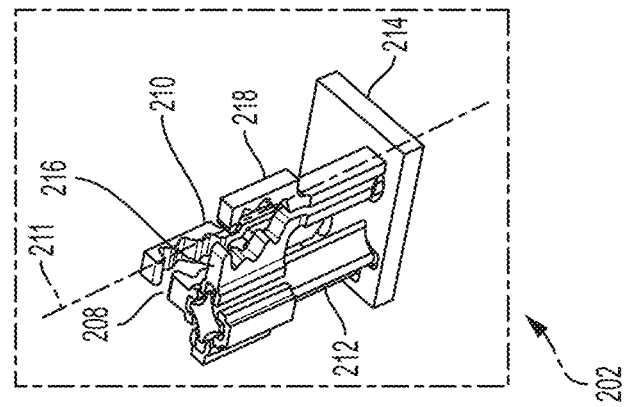
FIG. 2C is an isometric view of a unit cell of a dual-polarized phased array antenna according to examples of the disclosure.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Reference is sometimes made herein to an array antenna having a particular configuration (e.g. a planar array). One of ordinary skill in the art would appreciate that the techniques described herein are applicable to various sizes and shapes of array antennas. It should thus be noted that although the description provided herein describes the concepts in the context of a rectangular array antenna, those of ordinary skill in the art would appreciate that the concepts equally apply to other sizes and shapes of array antennas including, but not limited to, arbitrarily shaped planar array antennas as well as cylindrical, conical, spherical and arbitrarily shaped conformal array antennas.

Reference is also made herein to the array antenna including radiating elements of a particular size and shape. For example, certain embodiments of radiating element are described having a shape and a size compatible with operation over a particular frequency range (e.g. 2-30 GHz). Those of ordinary skill in the art would recognize that other shapes of antenna elements may also be used and that the size of one or more radiating elements may be selected for operation over any frequency range in the RF frequency range (e.g. any frequency in the range from below 20 MHz to above 50 GHz).

Reference is sometimes made herein to generation of an antenna beam having a particular shape or beam width. Those of ordinary skill in the art would appreciate that antenna beams having other shapes and widths may also be used and may be provided using known techniques such as by inclusion of amplitude and phase adjustment circuits into appropriate locations in an antenna feed circuit.

Described herein are embodiments of frequency-scaled ultra-wide spectrum phased array antennas. These phased array antennas are formed of repeating cells of frequency-scaled ultra-wide spectrum radiating elements. Phased array antennas according to certain embodiments exhibit very low profile, wide bandwidth, low cross-polarization, and high scan-volume while being low cost, small aperture, modular with built-in RF interconnect, and scalable.

A unit cell of a frequency-scaled ultra-wide spectrum phased array antenna, according to certain embodiments, includes a pattern of radiating elements. According to certain embodiments, the radiating elements are formed of substrate-free, interlacing components that include a pair of metallic ears that form a coplanar transmission line. One of the ears is the ground component of the radiating element and can be terminated to the ground of a coaxial connector used for connecting a feed line or directly to the array's base plate. The other ear is the signal or active line of the radiating element and can be connected to the center of a coaxial feed line. According to certain embodiments, the edge of the radiating elements (the edge of the ears) are shaped to encapsulate a cross-shape metallic clustered pillar, which controls the capacitive component of the antenna and can allow good impedance matching at the lower-frequency end of the bandwidth, effectively increasing the operational bandwidth. This has the advantage of a phased array antenna in which no wideband impedance matching network or special mitigation to a ground plane is needed. Radiating elements can be for transmit, receive, or both. Phased array antennas can be built as single polarized or dual polarized by implementing the appropriate radiating element pattern, as described below.

FIG. 1A illustrates an antenna array of radiating elements 100 according to certain embodiments. A dual polarized configuration is shown with radiating elements oriented both horizontally 106 and vertically 104. In this embodiment, a unit cell 102 includes a single horizontally polarized element 110 and a single vertically polarized element 108 (FIG. 1B). Array 100 is a 4×3 array of unit cells 102. According to certain embodiments, array 100 can be scaled up or down to operate over a specified frequency range. More unit cells can be added to meet other specific design requirements such as antenna gain. According to certain embodiments, modular arrays of a predefined size may be combined into a desired configuration to create an antenna array to meet the required performance. For example, a module may include the 4×3 array of radiating elements 100 illustrated in FIG. 1A. A particular antenna application requiring 96 radiating elements can be built using eight modules fitted together (thus, providing the 96 radiating elements). This modular design allows for antenna arrays to be tailored to specific design requirements at a lower cost.

As shown in FIG. 1B, element 108 is disposed along a first axis and element 110 is disposed along a second axis that is orthogonal to the first axis, such that element 108 is substantially orthogonal to element 110. This orthogonal orientation results in each unit cell 102 being able to generate orthogonally directed electric field polarizations. That is, by disposing one set of elements (e.g. vertical elements 104) in one polarization direction and disposing a second set of elements (e.g. horizontal elements 106) in the orthogonal polarization direction, an antenna which can generate signals having any polarization is provided. In this particular example, unit cells 102 are disposed in a regular pattern, which here corresponds to a square grid pattern. Those of ordinary skill in the art would appreciate that unit cells 102 need not all be disposed in a regular pattern. In some applications, it may be desirable or necessary to dispose unit cells 102 in such a way that elements 108 and 110 of each unit cell 102 are not aligned between every unit cell 102. Thus, although shown as a square lattice of unit cells 102, it would be appreciated by those of ordinary skill in the art, that antenna 100 could include but is not limited to a rectangular or triangular lattice of unit cells 102 and that each of the unit cells can be rotated at different angles with respect to the lattice pattern.

Symmetric Phased Array

Figure 2B:
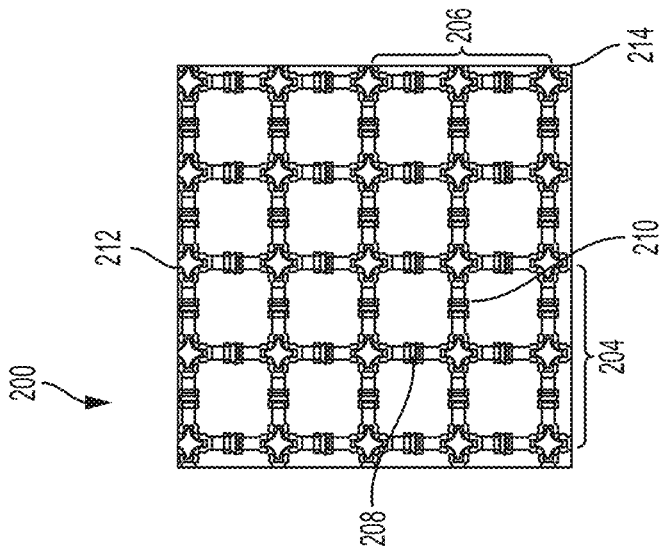
FIG. 2B is a top view of a dual-polarized phased array antenna according to examples of the disclosure.
Figure 2A:
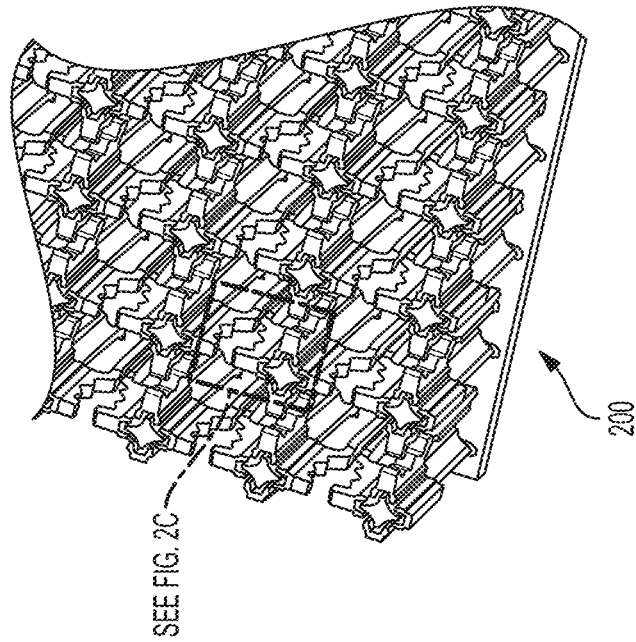
FIG. 2A is an isometric view of a dual-polarized phased array antenna according to examples of the disclosure.

An array of radiating elements 200 according to certain embodiments is illustrated in FIGS. 2A and 2B. Array 200 is a dual-polarized configuration with multiple columns of radiating elements 204 oriented along a first polarization axis (referred to herein as vertically polarized) and multiple rows of radiating elements 206 oriented along a second polarization axis (referred to herein as horizontally polarized) affixed to base plate 214. A unit cell 202 of array 200 is shown in detail in FIG. 2C. Unit cell 202 includes two radiating elements, a vertically polarized radiating element 208 and a horizontally polarized radiating element 210. Horizontally polarized radiating element 210 includes signal ear 216 and ground ear 218. A signal beam is generated by exciting radiating element 210, i.e. by generating a voltage differential between signal ear 216 and ground ear 218. The generated signal beam has a direction along the centerline 211 of radiating element 210, perpendicular to base plate 214. Centerline 211 is the phase center of radiating element 210. A signal beam generated by exciting radiating element 208, has a phase center midway between its respective signal and ground ear. As shown in the embodiments of FIGS. 2A-2C, the phase centers of radiating elements 204 are not co-located with the phase centers of radiating elements 206.

In the embodiments of FIG. 2, the radiating elements 204 are of the same size, shape, and spacing as radiating elements 206. However, phased array antennas according to other embodiments, may include only single polarized radiating elements (e.g., only rows of radiating elements 206). According to some embodiments, the spacing of one set of radiating elements (e.g., the horizontally polarized elements 206) is different from the spacing of the other set of radiating elements (e.g., the vertically polarized elements 204). According to some embodiments, the radiating element spacing within a row may not be uniform. For example, the spacing between first and second elements within a row may be different than the spacing between the second and third elements.

Figure 3C:
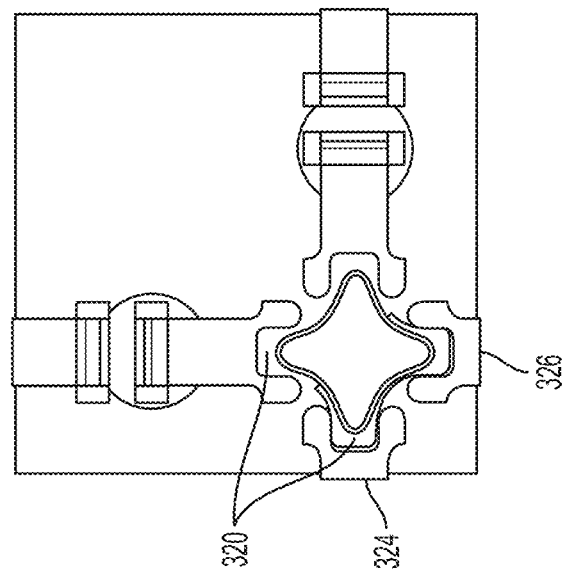
FIG. 3C is a top view of a unit cell of dual-polarized phased array antenna according to examples of the disclosure.
Figure 3B:
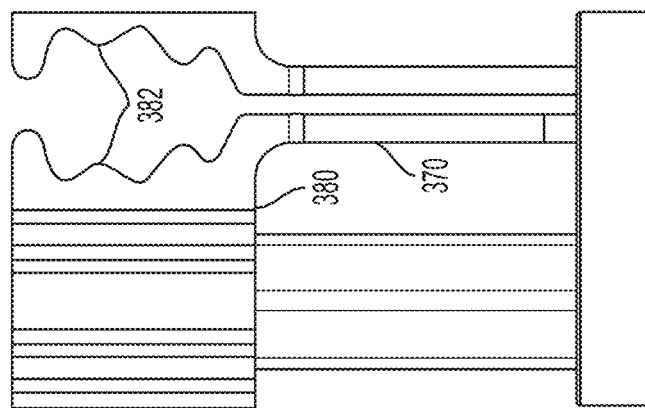
FIG. 3B is a side view of a unit cell of dual-polarized phased array antenna according to examples of the disclosure.
Figure 3A:
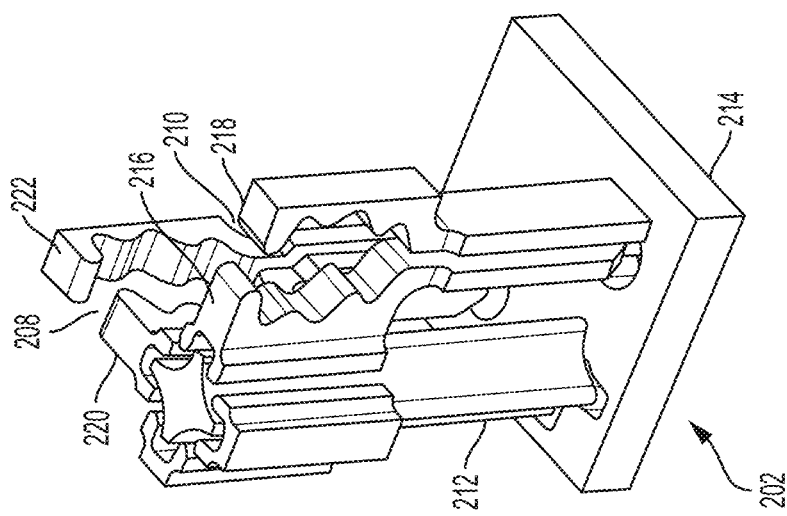
FIG. 3A is an isometric view of a unit cell of dual-polarized phased array antenna according to examples of the disclosure.

FIGS. 3A, 3B, and 3C provide enlarged views of unit cell 202 according to certain embodiments. Radiating element 208 includes signal ear 220 and ground ear 222. Clustered pillar 212 and ground ear 222 may be both electrically coupled to base plate 214 such that no (or minimal) electrical potential is generated between them during operation. Signal ear 220 is electrically isolated (insulated) from base plate 214, clustered pillar 212, and ground ear 222. According to certain embodiments, a second set of radiating elements 210 are disposed along a second, orthogonal axis. Radiating element 210 includes signal ear 216 and ground ear 218. Clustered pillar 212 and ground ear 218 may be both electrically coupled to base plate 214 such that no (or minimal) electrical potential is generated between them during operation. According to certain embodiments, clustered pillar 212 and ground ear 218 are not electrically connected to base plate 214 but instead to a separate ground circuit. Signal ear 216 is electrically isolated (insulated) from base plate 214, clustered pillar 212, and ground ear 218.

According to certain embodiments, the edges of the radiating elements (the edge of the ears) are shaped to encapsulate cross-shaped metallic clustered pillar 212 to capacitively couple adjacent radiating elements during operation. This can enhance the capacitive component of the antenna, which allows a good impedance match at the low-frequency end of the bandwidth. Through this coupling of clustered pillar 212, each radiating element in a row or column is electromagnetically coupled to ground and the previous and next radiating element in the row or column.

Capacitive coupling is achieved by maintaining a gap 320 between a radiating element ear and its adjacent clustered pillar, which creates interdigitated capacitance between the two opposing surfaces of gap 320. This capacitance can be used to improve the impedance matching of the antenna. Capacitive coupling can be controlled by changing the overlapped surface area of gap 320 and width of gap 320 (generally, higher capacitance is achieved with larger surface area and less width). According to certain embodiments, signal ears 220 and 216 and ground ears 222 and 218 wrap around the cross shape of clustered pillar 212 in order to maximize the surface area. However, other designs for maximizing the capacitive surface area are also contemplated. For example, a clustered pillar and adjacent ear can form interlacing fingers when viewed from above (e.g., the view of FIG. 3C) or interlacing fingers when viewed from the side (e.g., the view of FIG. 3B). According to certain embodiments, gap 320 is less than 0.1 inches, preferably less than 0.05 inches, and more preferably less than 0.01 inches. According to some embodiments, gap 320 may be scaled with frequency (for example, gap 320 may be a function of the wavelength of the highest designed frequency, $\lambda$). For example, according to some embodiments, gap 320 can be less than $0.05\lambda$, less than $0.025\lambda$, or less than $0.013\lambda$. According to some embodiments, gap 320 is greater than $0.005\lambda$, greater than $0.01\lambda$, greater than $0.025\lambda$, greater than $0.05\lambda$, or greater than $0.1\lambda$. As shown in FIG. 3B, according to certain embodiments, the radiating ears include stem portions 370 extending from base plate 214 to comb portions 380 that include a plurality of irregularly shaped projections 382. According to certain embodiments, gap 320 extends perpendicularly to base plate 214 (i.e., along the length of the clustered pillar/radiating element) for the same distance and located adjacent comb portion 380.

Interdigitated capacitance enables some coupling between adjacent radiating elements in a row (or column). In other words, the electromagnetic field from a first radiating element communicates from its ground ear across the adjacent gap to the adjacent clustered pillar through the interdigitated capacitance and then across the opposite gap to the adjacent signal ear of the next radiating element. Referring to FIGS. 3A and C, which shows a top view of unit cell 202, clustered pillar 212 is surrounded by four radiating element ears. On the right side is signal ear 216 of radiating element 210. On the left side is the ground ear 324 of the next radiating element along that axis. On the top side is signal ear 220 of radiating element 208. On the bottom side is the ground ear 326 of the next radiating element along that axis. Capacitive coupling between clustered pillar 212 and each ear 216 and 324 created by adjacent gaps 320 enable the electromagnetic field of radiating element 208 to couple to the electromagnetic field of the next radiating element (the radiating element of ground ear 324), and capacitive coupling between clustered pillar 212 and each ear 220 and 326 created by respective adjacent gaps 320 enable the electromagnetic field of radiating element 210 to couple to the electromagnetic field of the next radiating element (the radiating element that includes ground ear 326).

It should be understood that the illustrations of unit cell 202 in 2C, 3A, 3B, and 3C truncate ground ears 324 and 326 on the left and bottom side of clustered pillar 212 for illustrative purposes only. One of ordinary skill in the art would understand that the relative orientation of one set of radiating elements to an orthogonal set of radiating elements, as described herein, is readily modified, i.e. a signal ear could be on the left side of clustered pillar 212 with a ground ear being on the right side, and/or a signal ear could be on the bottom side of clustered pillar 212 with a ground ear being on the top side (relative to the view of FIG. 3C).

According to certain embodiments, base plate 214 is formed from one or more conductive materials, such as metals like aluminum, copper, gold, silver, beryllium copper, brass, and various steel alloys. According to certain embodiments, base plate 214 is formed from a non-conductive material such as various plastics, including Acrylonitrile butadiene styrene (ABS), Nylon, Polyamides (PA), Polybutylene terephthalate (PBT), Polycarbonates (PC), Polyetheretherketone (PEEK), Polyetherketone (PEK), Polyethylene terephthalate (PET), Polyimides, Polyoxymethylene plastic (POM/Acetal), Polyphenylene sulfide (PPS), Polyphenylene oxide (PPO), Polysulphone (PSU), Polytetrafluoroethylene (PTFE/Teflon), or Ultra-high-molecular-weight polyethylene (UHMWPE/UHMW), that is plated or coated with a conductive material such as gold, silver, copper, or nickel. According to certain embodiments, base plate 214 is a solid block of material with holes, slots, or cut-outs to accommodate clustered pillars 212, signal ears 216 and 220, and ground ears 218 and 222 on the top (radiating) side and connectors on the bottom side to connect feed lines. In other embodiments, base plate 214 includes cutouts to reduce weight.

According to certain embodiments, base plate 214 is designed to be modular and includes features in the ends that can mate with adjoining modules. Such interfaces can provide both structural rigidity and cross-interface conductivity. Modules may be various sizes incorporating various numbers of unit cells of radiating elements. According to certain embodiments, a module is a single unit cell. According to certain embodiments, modules are several unit cells (e.g., 2×2, 4×4), dozens of unit cells (e.g., 5×5, 6×8), hundreds of unit cells (e.g., 10×10, 20×20), thousands of unit cells (e.g., 50×50, 100×100), tens of thousands of unit cells (e.g., 200×200, 400×400), or more. According to certain embodiments, a module is rectangular rather than square (i.e., more cells along one axis than along the other).

According to certain embodiments, modules align along the centerline of a radiating element such that a first module ends with a ground clustered pillar and the next module begins with a ground clustered pillar. The base plate of the first module may include partial cutouts along its edge to mate with partial cutouts along the edge of the next module to form a receptacle to receive the radiating elements that fit between the ground clustered pillars along the edges of the two modules. According to certain embodiments, the base plate of a module extends further past the last set of ground clustered pillars along one edge than it does along the opposite edge in order to incorporate a last set of receptacles used to receive the set of radiating elements that form the transition between one module and the next. In these embodiments, the receptacles along the perimeter of the array remain empty. According to certain embodiments, a transition strip is used to join modules, with the transition strip incorporating a receptacle for the transition radiating elements. According to certain embodiments, no radiating elements bridge the transition from one module to the next. Arrays formed of modules according to certain embodiments can include various numbers of modules, such as two, four, eight, ten, fifteen, twenty, fifty, a hundred, or more.

In some embodiments, base plate 214 may be manufactured in various ways including machined, cast, or molded. In some embodiments, holes or cut-outs in base plate 214 may be created by milling, drilling, formed by wire EDM, or formed into the cast or mold used to create base plate 214. Base plate 214 can provide structural support for each radiating element and clustered pillar and provide overall structural support for the array or module. Base plate 214 may be of various thicknesses depending on the design requirements of a particular application. For example, an array or module of thousands of radiating elements may include a base plate that is thicker than the base plate of an array or module of a few hundred elements in order to provide the required structural rigidity for the larger dimensioned array. According to certain embodiments, the base plate is less than 6 inches thick. According to certain embodiments, the base plate is less than 3 inches thick, less than 1 inch thick, less than 0.5 inches thick, less than 0.25 inches thick, or less than 0.1 inches thick. According to certain embodiments, the base plate is between 0.2 and 0.3 inches thick. According to some embodiments, the thickness of the base plate may be scaled with frequency (for example, as a function of the wavelength of the highest designed frequency, $\lambda$). For example, the thickness of the base plate may be less than $1.0\lambda$, $0.5\lambda$, or less than $0.25\lambda$. According to some embodiments, the thickness of the base plate is greater than $0.1\lambda$, greater than $0.25\lambda$, greater than $0.5\lambda$, or greater than $1.0\lambda$.

According to certain embodiments, radiating ears 216, 218, 220 and 222 and clustered pillar 212 may be formed from any one or more materials suitable for use in a radiating antenna. These may include materials that are substantially conductive and that are relatively easy to machine, cast and/or solder or braze. For example, one or more radiating ears 216, 218, 220 and 222 and clustered pillar 212 may be formed from copper, aluminum, gold, silver, beryllium copper, or brass. In some embodiments, one or more radiating ears 216, 218, 220 and 222 and clustered pillar 212 may be substantially or completely solid. For example, one or more radiating ears 216, 218, 220 and 222 and clustered pillar 212 may be formed from a conductive material, for example, substantially solid copper, brass, gold, silver, beryllium copper, or aluminum. In other embodiments, one or more radiating ears 216, 218, 220 and 222 and clustered pillar 212 are substantially formed from non-conductive material, for example plastics such as ABS, Nylon, PA, PBT, PC, PEEK, PEK, PET, Polyimides, POM, PPS, PPO, PSU, PTFE, or UHMWPE, with their outer surfaces coated or plated with a suitable conductive material, such as copper, gold, silver, or nickel.

In other embodiments, one or more radiating ears 216, 218, 220 and 222 and clustered pillar 212 may be substantially or completely hollow, or have some combination of solid and hollow portions. For example, one or more radiating ears 216, 218, 220 and 222 and clustered pillar 212 may include a number of planar sheet cut-outs that are soldered, brazed, welded or otherwise held together to form a hollow three-dimensional structure. According to some embodiments, one or more radiating ears 216, 218, 220 and 222 and clustered pillar 212 are machined, molded, cast, or formed by wire-EDM. According to some embodiments, one or more radiating ears 216, 218, 220 and 222 and clustered pillar 212 are 3D printed, for example, from a conductive material or from a non-conductive material that is then coated or plated with a conductive material.

Referring now to FIGS. 3A, 4A, and 4B, a method of manufacturing an array according to certain embodiments will be described. Base plate 214, radiating ears 216, 218, 220 and 222, and clustered pillar 212 are each separate pieces that may be manufactured according to the methods described above. Clustered pillar 212 is assembled to base plate 214 by welding or soldering onto base plate 214. In some embodiments, clustered pillar 212 is press fit (interference fit) into a hole in base plate 214. According to certain embodiments, clustered pillar 212 is screwed into base plate 214. For example, male threads may be formed into the bottom portion of clustered pillar 212 and female threads may be formed into the receiving hole in base plate 214. According to certain embodiments, clustered pillar 212 is formed with a pin portion at its base that presses into a hole in base plate 214. According to certain embodiments, a bore is machined into clustered pillar 212 at the base to accommodate an end of a pin and a matching bore is formed in base plate 214 to accommodate the other end of the pin. Then the pin is pressed into the clustered pillar 212 or the base plate 214 and the clustered pillar 212 is pressed onto the base plate 214.

Referring to FIGS. 4A and 4B, a radiating element is assembled as a sub-assembly, which is inserted into base plate 214, according to certain embodiments. Signal ear 416 and ground ear 418 are separate pieces formed according to one or more methods including those described above. Signal ear 416 and ground ear 418 are assembled to plug 428. Plug 428 may be formed of a dielectric material, such as plastic, in order to maintain the electrical isolation of signal ear 416 from ground ear 418 and base plate 414. Plug 428 may be formed from various plastics such as ABS, Nylon, PA, PBT, PC, PEEK, PEK, PET, Polyimides, POM, PPS, PPO, PSU, or UHMWPE. Preferably, plug 428 is formed of resin, PTFE, or polylactic acid (PLA). According to certain embodiments, signal ear 416 and ground ear 418 are inserted into receptacles in plug 428, for example by press-fitting, to form assembly 440. According to other embodiments, plug 428 is molded around signal ear 416 and ground ear 418. Assembly 440 may then be assembled to the base plate 414 by sliding between clustered pillars 412 and 430 that have been previously assembled to base plate 414, for example, according to the methods described above. Plug 428 can then fit into a hole or bore in base plate 414, for example by press fitting. Plug 428 may be designed to not only provide structural support for signal ear 416 and ground ear 418 and but also for impedance transformation to mate with a coaxial connector, as described in more detail below.

Referring now to FIGS. 3A and 3C, gap 320 may be an airgap or it may be provided by a dielectric material, or a combination of both. As described above, gap 320 may be minimized in order to maximize the capacitive coupling of ground clustered pillar 212 with the adjacent radiating elements (e.g., 208 and 210). Minimizing gap 320 can be difficult when assembling multiple different components (e.g. base plate 214, clustered pillar 212, ears 220 and 216), each with their own manufacturing tolerances. Furthermore, the antenna array (e.g., array 200) may be subject to vibration that may cause adjacent radiating elements ears to contact clustered pillar 212 causing a short circuit. To manage these issues, according to certain embodiments, gap 320 is created and maintained by providing a dielectric coating (not shown) on clustered pillar 214. According to certain embodiments, dielectric coatings may be epoxy coatings, PTFE, or a melt processable fluoropolymer applied using, for example, a spraying or dipping process.

Figure 5C:
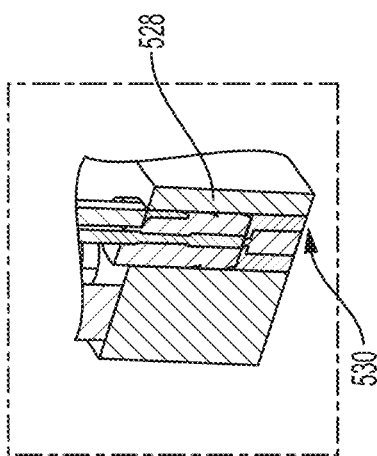
FIG. 5C is a cross-sectional view of a built-in radiating element RF interconnect/connector according to examples of the disclosure.
Figure 5D:
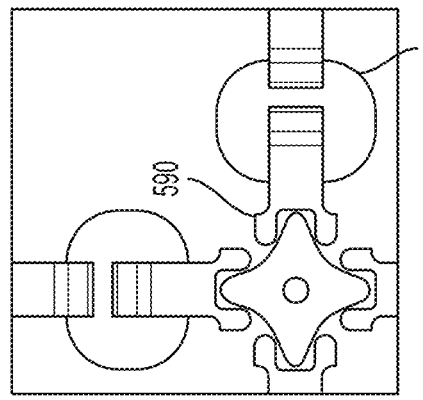
FIG. 5D is a top view of a unit cell of a dual-polarized phased array antenna with dielectric sleeve according to examples of the disclosure.
Figure 5B:
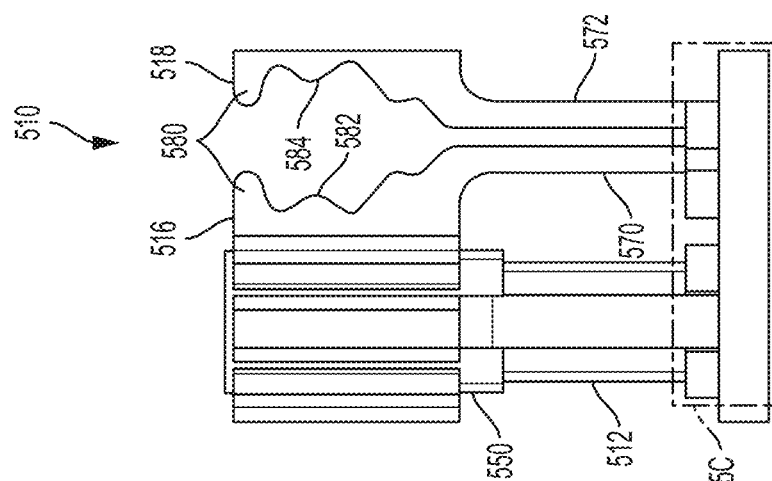
FIG. 5B is a side view of a unit cell of a dual-polarized phased array antenna with dielectric sleeve according to examples of the disclosure.
Figure 5A:
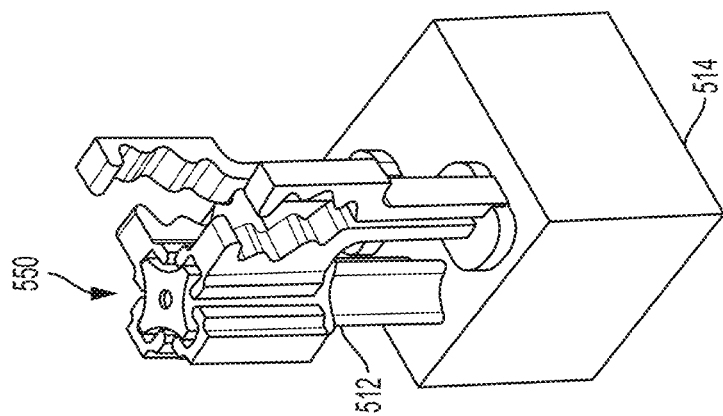
FIG. 5A is an isometric view of a unit cell of a dual-polarized phased array antenna with dielectric sleeve according to examples of the disclosure.

According to certain embodiments, for example as shown in FIGS. 5A, 5B, and 5D, gap 520 is created or maintained by dielectric sleeve 550 that slides over clustered pillar 512. Sleeve 550 may be formed from various dielectric materials such as plastics like ABS, Nylon, PA, PBT, PC, PEEK, PEK, PET, Polyimides, POM, PPS, PPO, PSU, PTFE, or UHMWPE. Sleeve 550 may made from a high strength plastic in order to minimize wall thickness. According to certain embodiments, sleeve 550 is formed from a heat shrink material, such as nylon or polyolefin, in the form of a tube that slides over clustered pillar 512, which is heated to shrink onto clustered pillar 512. According to certain embodiments, sleeve 550 is 3D printed from a polymer. Sleeve 550 is preferably designed with minimal wall thickness. According to certain embodiments, the thickness of sleeve 550 is less than 0.1 inches, preferably less than 0.05 inches, and more preferably less than 0.01 inches.

FIG. 5C illustrates a feed arrangement for providing the excitation to radiating element 502 according to certain embodiments. As described above, a radio beam is generated by creating an electrical potential between signal ear 516 and ground ear 518. This electrical potential is created by feeding voltage to signal ear 516 and grounding ground ear 518. According to certain embodiments, signal ear 516 is fed by connecting a coaxial cable to a coaxial connector 530 embedded or inserted in the bottom of base plate 514. Signal ear 516 is electrically connected to the center line inside plug 528. According to some embodiments, signal ear 516 forms the center line inside plug 528. Signal ear 516 is electrically connected to the inner conductor (core line) of a feed line through coaxial connector 530 as shown in FIG. 5C.

According to certain embodiments, connector 530 is a female connector. Base plate 514 may be electrically connected to the outer conductor (shield) of the coaxial cable through the body of coaxial connector 530. According to certain embodiments, ground ear 518 is directly electrically connected to the outer conductor of the coaxial cable through a ground conductor of coaxial connector 530. In other embodiments, ground ear 518 is inserted or formed into a side of plug 528 such that a portion of the ground ear is exposed, as depicted in FIGS. 5A and 5C. When plug 528 is inserted into base plate 514, the exposed side of ground ear 518 makes contact with base plate 514. Ground ear 518 is then electrically connected to base plate 514, which is in turn, electrically connected to ground through, for example, coaxial connector 530 or some other grounding means.

According to certain embodiments, signal ear 516, ground ear 518, plug 528, and connector 530 are built together as a subassembly that may then be assembled into base plate 514. According to certain embodiments, the center conductor of coaxial connector 530 and signal ear 516 are formed from a single piece of material. According to certain embodiments, connector 530 is embedded within base plate 528 (as shown in FIG. 5C). According to some embodiments, connector 530 protrudes from the bottom of base plate 528, protrudes from a recess in the bottom of base plate 514 or is affixed to the bottom plane of base plate 514. According to some embodiments, connector 530 is an off-the-shelf male or female connector, and according to other embodiments, connector 530 is custom built or modified for fitting into base plate 514. According to certain embodiments, connector 530 is designed to be directly attached to a feed line. According to other embodiments, connector 530 is attached to a feed line through an intermediate manifold that, itself, directly connects to feed lines.

FIGS. 6A, 6B, and 6C illustrate an antenna array 600 according to certain embodiments. Base plate 614 is formed from a block of aluminum. Clustered pillars 612 are machined directly into base plate 614 allowing for relatively good positional tolerances. A 3D printed dielectric sleeve 650 covers the ends of each clustered pillar 612. Radiating element assembly 608 is shown in FIG. 6B. In this figure, each ear 216 and 218 is formed of beryllium copper that has been shaped using wire EDM. Plug 628 is formed from a plastic such as resin, Teflon, or PLA that is molded around ears 216 and 218. Ground ear 218 is positioned on the side of plug 628 such that when the assembly 640 is assembled to base plate 614, ground ear 618 contacts the bore in base plate 614, thus creating a conducting path. Assembly 640 is assembled to base plate 614 by pressing plug 628 into the receiving bore or cut-out in base plate 614, for example using a slight interference fit. According to certain embodiments, plug 628 has an oblong shape that is longer in one direction than in the orthogonal direction to maintain the orientation of the ears along the axis of the relative row such that the capacitive coupling portion of the ears mate with the sleeve covered, cross shaped protrusions of the clustered pillar 612.

Returning to the examples of FIGS. 2A-2C, the phased array antenna 200, according to certain embodiments, has a designed operational frequency range, e.g., 1 to 30 GHz, 2 to 30 GHz, 3 to 25 GHz, and 3.5 to 21.5 GHz. According to certain embodiments, the phased array antenna is designed to operate at a frequency of at least 1 GHz, at least 2 GHz, at least 3 GHz, at least 5 GHz, at least 10 GHz, at least 15 GHz, or at least 20 GHz. According to certain embodiments, the phased array antenna is designed to operate at a frequency of less than 50 GHz, less than 40 GHz, less than 30 GHz, less than 25 GHz, less than 22 GHz, less than 20 GHz, or less than 15 GHz. The sizing and positioning of radiating elements can be designed to effectuate these desired frequencies and ranges. For example, the spacing between a portion of a first radiating element and the portion of the next radiating element along the same axis may be equal to or less than about one-half a wavelength, $\lambda$, of a desired frequency (e.g., highest design frequency). According to some embodiments, the spacing may be less than $1\lambda$, less than $0.75\lambda$, less than $0.66\lambda$, less than $0.33\lambda$, or less than $0.25\lambda$. According to some embodiments, the spacing may be equal to or greater than $0.25\lambda$, equal to or greater than $0.5\lambda$, equal to or greater than $0.66\lambda$, equal to or greater than $0.75\lambda$, or equal to or greater than $1\lambda$.

Additionally, the height of radiating element 208 and 210 may be less than about one-half the wavelength of the highest desired frequency. According to some embodiments, the height may be less than 1λ, less than 0.75λ, less than 0.66λ, less than 0.33λ, or less than 0.25λ. According to some embodiments, the height may be equal to or greater than 0.25λ, equal to or greater than 0.5λ, equal to or greater than 0.66λ, equal to or greater than 0.75λ, or equal to or greater than 1λ. For example, according to certain embodiments where the operational frequency range is 2 GHz to 14 GHz, with the wavelength at the highest frequency, 14 GHz, being about 0.84 inches, the spacing from one radiating element to another radiating element is less than about 0.42 inches. According to certain embodiments, for this same operating range, the height of a radiating element from the base plate is less than about 0.42 inches.

As another example, according to certain embodiments where the operational frequency range is 3.5 GHz to 21.5 GHz, with the wavelength at the highest frequency, 21.5 GHz, being about 0.6 inches, the spacing from one radiating element to another radiating element is less than about 0.3 inches. According to certain embodiments, for this same operating range, the height of a radiating element from the base plate is less than about 0.3 inches. It should be appreciated decreasing the height of the radiating elements can improve the cross-polarization isolation characteristic of the antenna. It should also be appreciated that using a radome (an antenna enclosure designed to be transparent to radio waves in the operational frequency range) can provide environmental protection for the array. The radome may also serve as a wide-angle impedance matching (WAIM) that improves the voltage standing wave ration (VSWR) of the array at wide-scan angles (improves the impedance matching at wide-scan angles).

According to certain embodiments, more spacing between radiating elements eases manufacturability. However, as described above, a maximum spacing can be selected to prevent grating lobes at the desired scan volumes. According to certain embodiments, the selected spacing reduces the manufacturing complexity, sacrificing scan volume, which may be advantageous where scan volume is not critical.

According to certain embodiments, the size of the array is determined by the required antenna gain. For example, for certain application over 40,000 elements are required. For another example, an array of 128 elements may be used for bi-static radar.

Asymmetric Phased Array

Figure 7B:
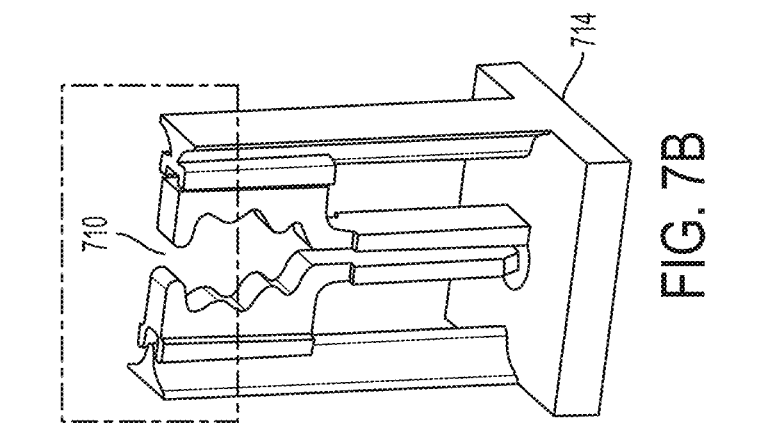
FIG. 7B is an isometric view of a unit cell of a single-polarized phased array antenna according to examples of the disclosure.
Figure 7C:
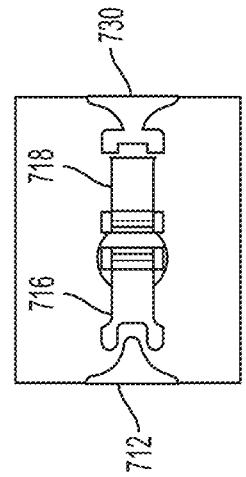
FIG. 7C is a top view of a unit cell of a single-polarized phased array antenna according to examples of the disclosure.
Figure 7A:
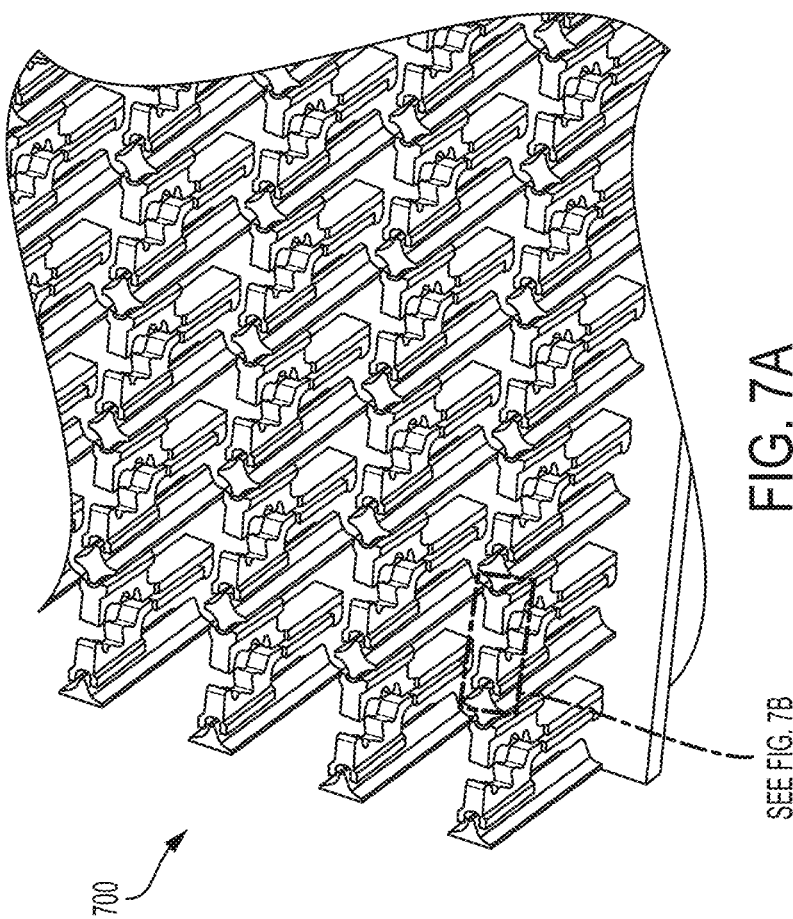
FIG. 7A is an isometric view of a single-polarized phased array antenna according to examples of the disclosure.

According to certain embodiment an asymmetric design is employed to increase the manufacturability of the phased array antenna. FIGS. 7A, 7B, and 7C illustrate a single polarized array 700 according to certain embodiments employing an asymmetric design. Each radiating element 710 includes a pair of metallic ears (716 and 718) that form a coplanar transmission line. Ground ear 718 is formed into the same block of material as base plate 714 and clustered pillars 712 and 730 and is effectively electrically terminated directly to base plate 714. As in the symmetric design described above, signal ear 716 can be connected to the center of a coaxial feed line. The edge of signal ear 716 is shaped to encapsulate clustered pillar 712, but the edge of ground ear 718 is substantially planar and does not wrap around clustered pillar 712. This enables ground ear 718 to be easily machined into the same base plate material or otherwise easily formed along with base plate 714.

Following is a description of the asymmetric design, according to certain embodiments. A unit cell of the phased array antenna is shown in FIG. 7B with a top view shown in FIG. 7C. As shown, for example on the right-hand side of FIG. 7C, ground ear 718 is shaped differently on its capacitive coupling side than, for example, ground ear 418 in FIG. 4A. The capacitive coupling surface is flattened. This enables ground ear 418 to be machined into base plate 712, i.e. base plate 712 and ground ear 718 are machined into the same block of material. Additionally, according to certain embodiments, clustered pillar 730 has an irregular shape (as opposed to the regular cross shape of clustered pillar 212 in FIG. 3C, for example). The portion of clustered pillar 730 that capacitively couples with ground ear 718 is also flattened or planar to match clustered pillar 730. As shown on the right side of FIG. 7C, signal ear 716 has the same shape as the signal ear described above and the right side of clustered pillar 712 has the same cross shape as described in the sections above. This asymmetry enables base plate 714, clustered pillars 712 and 760, and ground ear 718 to be machined, or otherwise formed from the same piece of material increasing manufacturability by reducing the number of pieces, the assembly time, and tolerance stack-up effects while also maintaining performance.

Figure 8B:
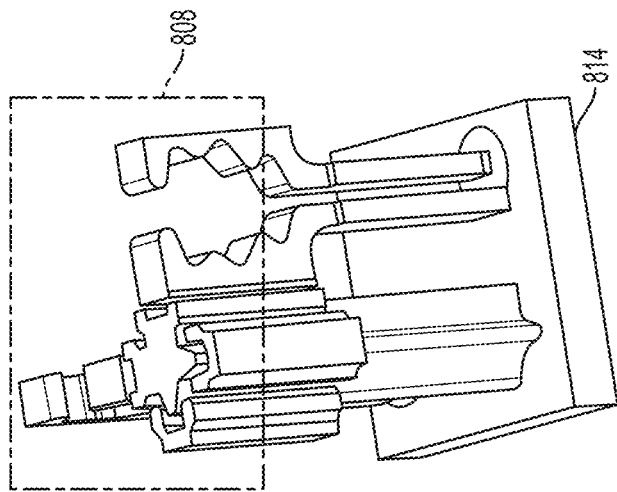
FIG. 8B is an isometric view of a unit cell of a dual-polarized phased array antenna according to examples of the disclosure.
Figure 8A:
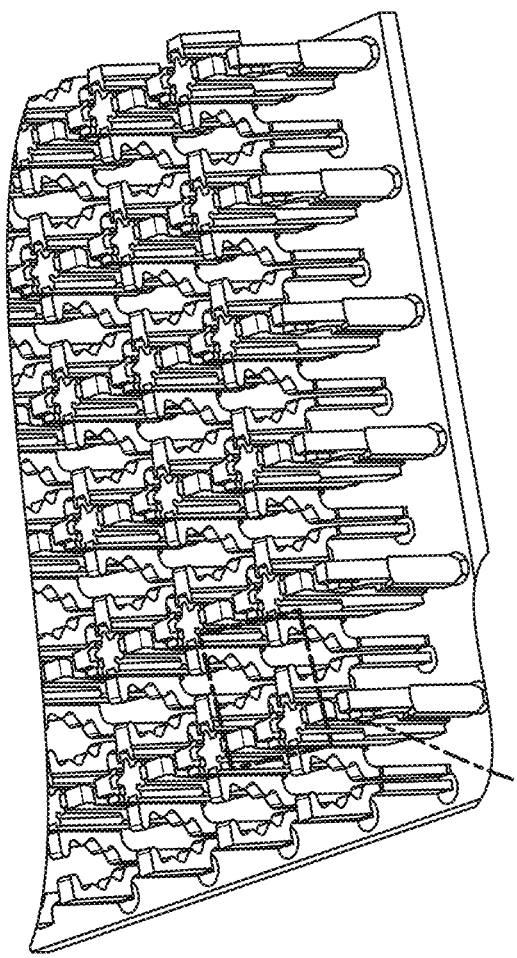
FIG. 8A is an isometric view of a dual-polarized phased array antenna according to examples of the disclosure.
Figure 8C:
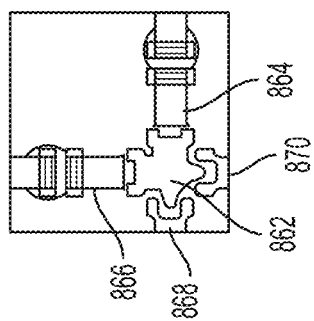
FIG. 8C is a top view of a unit cell of a dual-polarized phased array antenna according to examples of the disclosure.

According to certain embodiments, an asymmetric design is employed for a dual-polarized phased array antenna as shown in FIGS. 8A, 8B, and 8C. The same asymmetric configuration can be used for an orthogonal set of radiating elements 808. As shown in the top view of FIG. 8C, clustered pillar 862 is surrounded by ground ears 864 and 868 and signal ears 868 and 870. Signal ears 868 and 870 include the same or similar u-shaped capacitive coupling surface described above while ground ears 864 and 866 incorporate a planar shape. This asymmetrical design enables clustered pillar 862 and ground ears 864 and 866 to be formed into the same piece of material as base plate 814.

According to certain embodiments, base plate 814, the clustered pillars (e.g., 862) and the ground ears (e.g., 864 and 866) are formed from conductive materials, such as a metal like aluminum, copper, gold, silver, beryllium copper, brass, and various steel alloys. According to certain embodiments, base plate 814, the clustered pillars (e.g., 862) and the ground ears (e.g., 864 and 866) are formed from a non-conductive material such as various plastics, including ABS, Nylon, PA, PBT, PC, PEEK, PEK, PET, Polyimides, POM, PPS, PPO, PSU, PTFE, or UHMWPE, that is plated or coated with a conductive material such as gold, silver, copper, or nickel. According to certain embodiments, base plate 814, the clustered pillars (e.g., 862) and the ground ears (e.g., 864 and 866) are a solid block of material with holes, slots, or cut-outs to accommodate the signal ears (e.g., 868 and 870) and connectors on the bottom side to connect feed lines. In other embodiments, base plate 814, the clustered pillars (e.g., 862) and the ground ears (e.g., 864 and 866) include cutouts to reduce weight.

According to certain embodiments, base plate 814, the clustered pillars (e.g., 862) and the ground ears (e.g., 864 and 866) are designed to be modular and base plate 814 includes features in the ends to mate with adjoining modules. Such interfaces may be designed to provide both structural rigidity and good cross-interface conductivity. In some embodiments, base plate 814, the clustered pillars (e.g., 862) and the ground ears (e.g., 864 and 866) can be manufactured in various ways including machined, cast, molded, and/or formed using wire-EDM. In some embodiments, holes or cut-outs in base plate 214 may be created by milling, drilling, wire EDM, or formed into the cast or mold used to create base plate 814, the clustered pillars (e.g., 862) and the ground ears (e.g., 864 and 866). Base plate 814 may be of various thicknesses depending on the design requirements of a particular application. Base plate 814 can provide structural support for each radiating element and clustered pillar as well as provide overall structural support for the array. For example, an array of thousands of radiating elements may have a base plate that is thicker than that of an array of a few hundred elements in order to provide the required structural rigidity for the larger dimensioned array. According to certain embodiments, the base plate is less than 6 inches thick. According to certain embodiments, the base plate is less than 3 inches thick, less than 1 inch thick, less than 0.5 inches thick, less than 0.25 inches thick, or less than 0.1 inches thick. According to certain embodiments, the base plate is between 0.2 and 0.3 inches thick.

Radiating Element

As described above, radiating elements (e.g., 410 of FIG. 4A), according to certain embodiments, include pairs of radiating element ears, a ground ear (e.g., 418) and a signal ear (e.g., 418). The design of the radiating elements affects the beam forming and steering characteristics of the phased array antenna. For example, as discussed above, the height of the radiating element may affect the operational frequency range. For example, the shortest wavelength (corresponding to the highest frequency) may be equivalent to twice the height of the radiating element. In addition to this design parameter, other features of the radiating element can affect bandwidth, cross-polarization, scan volume, and other antenna performance characteristics. According to the embodiment shown in FIG. 4, radiating element 410 includes a symmetrical portion that is symmetrical from just above the top of plug 428 to the top of element 410 such that the upper portion of ground ear 418 is a mirror image of the upper portion of signal ear 416. Each ear includes a connecting portion for connecting to plug 428, a stem portion 470, and a comb portion 480. Each comb portion 480 includes an inner facing irregular surface 482 and an outward facing capacitive coupling portion 484.

An important design consideration in phased array antennas is the impedance matching of the radiating element. This impedance matching affects the achievable frequency bandwidth as well as the antenna gain. With poor impedance matching, bandwidth may be reduced and higher losses may occur resulting in reduced antenna gain.

As is known in the art, impedance refers, in the present context, to the ratio of the time-averaged value of voltage and current in a given section of the radiating elements. This ratio, and thus the impedance of each section, depends on the geometrical properties of the radiating element, such as, for example, element width, the spacing between the signal ear the ground ear, and the dielectric properties of the materials employed. If a radiating element is interconnected with a transmission line having different impedance, the difference in impedances ("impedance step" or "impedance mismatch") causes a partial reflection of a signal traveling through the transmission line and radiating element. The same can occur between the radiating element and free space. "Impedance matching" is a process for reducing or eliminating such partial signal reflections by matching the impedance of a section of the radiating element to the impedance of the adjoining transmission line or free space. As such, impedance matching establishes a condition for maximum power transfer at such junctions. "Impedance transformation" is a process of gradually transforming the impedance of the radiating element from a first matched impedance at one end (e.g., the transmission line connecting end) to a second matched impedance at the opposite end (e.g., the free space end).

According to certain embodiments, transmission feed lines provide the radiating elements of a phased array antenna with excitation signals. The transmission feed lines may be specialized cables designed to carry alternating current of radio frequency. In certain embodiments, the transmission feed lines may each have an impedance of 50 ohms. In certain embodiments, when the transmission feed lines are excited in-phase, the characteristic impedance of the transmission feed lines may also be 50 ohms. As understood by one of ordinary skill in the art, it is desirable to design a radiating element to perform impedance transformation from this 50 ohm impedance into the antenna at the connector, e.g., connector 530 in FIG. 5C, to the impedance of free space, given by 120×pi (377 ohms). By designing the radiating element, base plate, plug, and connector to achieve this impedance transformation, the phased array antenna can be easily coupled to a control circuit without the need for intermediate impedance transformation components.

According to certain embodiments, instead of designing the phased array antenna for 50 ohm impedance into connector 530, the antenna is designed for another impedance into connector 530, such as 100 ohms, 150 ohms, 200 ohms, or 250 ohms, for example. According to certain embodiments, a radiating element is designed for impedance matching to some other value than free space (377 ohms), for example, when a radome is to be used.

According to certain embodiments, the radiating element is designed to have optimal impedance transfer from transmission feed line to free space. It will be appreciated by those of ordinary skill in the art, that the radiating element can have various shapes to effect the impedance transformation required to provide optimal impedance matching, as described above. The described embodiments can be modified using known methods to match the impedance of the fifty ohm feed to free space.

Referring again to FIG. 5C, according to certain embodiments, connector 530, plug 258, and the connecting portions of signal ear 516 and ground ear 518 result in impedance at the base of the stem portions of the signal and ground ears of about 150 ohms. According to some embodiments, this value is between 50 and 150 ohms and in other embodiments, this value is between 150 and 350 ohms. According to certain embodiments, the value is around 300 ohms. The shape of the stem and comb portions are designed to perform the remaining impedance transformation (e.g., from 150 ohm to 377 ohm or from 300 ohm to 377 ohm).

Referring to FIG. 5B, stem portion 570 and 572 of signal ear 516 and ground ear 518, respectively, are parallel and spaced apart. According to certain embodiments, the distance between the stem portions is less than 0.5 inches, less than 0.1 inches, or less than 0.05. According to certain embodiments, the spacing is less than 0.025 inches, less than 0.02 inches, less than 0.015 inches, or less than 0.010 inches. According to some embodiments, the spacing between stem portions is selected to optimize the impedance matching of the antenna element. According to some embodiments, the spacing is selected based on the configuration of a connector embedded in base plate 514. According to some embodiments, the distance between the stem portions may be scaled with frequency (for example, the distance may be a function of the wavelength of the highest designed frequency). For example, according to some embodiments, the distance can be less than $0.05\lambda$, less than $0.025\lambda$, or less than $0.013\lambda$. According to some embodiments, the distance can be greater than $0.001\lambda$, greater than $0.005\lambda$, greater than $0.01\lambda$, or greater than $0.05\lambda$.

As shown in FIG. 5B, the comb portion 580 of signal ear 516 includes inner-facing irregular surface 582 and the comb portion 580 of ground ear 518 includes inner-facing irregular surface 584. The inner-facing irregular surfaces 582 and 584 are symmetrical and include multiple lobes or projections. The placement and spacing of the lobes affects the impedance transformation of radiating element 510. According to the embodiment shown in FIG. 5B, these inner-facing surfaces curve away from the center line starting near the top of the stem portions 570 and 572 into first valleys and then curve toward the centerline into first lobes. The surfaces then curve away again into second valleys and curve toward the centerline again into second lobes. From the second lobes, the surfaces curve away again into third valleys and then curve inward once more into final lobes. The sizes, shapes, and numbers of these lobes and valleys contribute to the impedance transformation of the radiating element. For example, according to certain embodiments, a radiating element ear includes only one lobe, for example, at the distal end (i.e., inner-facing irregular surface has a "C" shaped profile).

In addition to the shape, the thickness of a radiating element ear may also affect the impedance transformation of the radiating element. According to certain embodiments, the thickness is less than 0.5 inches or less than 0.25 inches. According to certain embodiments, the thickness is preferably less than 0.125 inches, less than 0.063, less than 0.032, less than 0.016, or less than 0.008 inches. According to certain embodiments, the thickness is between 0.035 and 0.045 inches. According to certain embodiments, the thickness is greater than 0.03 inches, greater than 0.1 inches, greater than 0.25 inches, greater than 0.5 inches, or greater than 1 inch. According to some embodiments, the thickness may be scaled with frequency (for example, the distance may be a function of the wavelength of the highest designed frequency). For example, according to some embodiments, the thickness can be less than $0.2\lambda$, less than $0.1\lambda$, less than $0.05\lambda$, or less than $0.01\lambda$. According to some embodiments, the thickness can be greater than $0.005\lambda$, greater than $0.01\lambda$, greater than $0.05\lambda$, or greater than $0.1\lambda$.

According to other embodiments, a radiating element ear includes two lobes, four lobes, five lobes, or more. According to certain embodiments, instead of lobes, the radiating element ear includes comb-shaped teeth, saw-tooth shaped lobes, blocky lobes, or a regular wave pattern. According to some embodiments, ears of radiating elements have other shapes, for example they may be splines, or straight lines. Straight line designs may be desirable if the antenna array is designed to operate only at a single frequency, if for example, the frequency spectrum is polluted at other frequencies. As appreciated by one of ordinary skill in the art, various techniques can be used to simulate the impedance transformation of radiating elements in order to tailor the shapes of the inner-facing irregular surfaces to the impedance transformation requirements for a given phased array antenna design.

In addition to impedance matching, the shape of the inner-facing surfaces of the comb portions can affect the operational frequency range. Other design considerations may also affect the frequency range. For example, the shape of the capacitive coupling portion 590 and the manner in which it forms a capacitive interface with the adjoining clustered pillar can affect the frequency range. According to certain embodiments, for example, an antenna array according to certain embodiments, without a clustered pillar may have a lower frequency threshold of 5 GHz and the same array with the clustered pillar may have a lower frequency threshold of 2 GHz.

According to certain embodiments, a radiating element 510 can be designed with certain dimensions to operate in a radio frequency band from 3 to 22 GHz. For example, radiating element 510 may be between 0.5 inches and 0.3 inches tall (preferably between 0.45 inches and 0.35 inches tall) from the top of base plate 514 to the top of radiating element 510. According to some embodiments, the height of the radiating elements may be scaled with frequency (for example, the height may be a function of the wavelength of the highest designed frequency). For example, according to some embodiments, the height can be less than $2.0\lambda$, less than $1.0\lambda$, less than $0.75\lambda$, less than $0.5\lambda$, or less than $0.25\lambda$. According to some embodiments, the height can be greater than $0.1\lambda$, greater than $0.2\lambda$, greater than $0.5\lambda$, or greater than $1.0\lambda$.

Stem portions 570 and 572 may be between than 0.5 inches and 0.1 inches tall and preferably between 0.2 inches and 0.25 inches tall. Stem portions 570 and 572 may be scaled by the radiating element height. For example, the height of the stem portions may be equal to or less than ¾ of the element height, equal to or less than ⅔ the element height, equal to or less than ½ the element height, or equal to or less than ¼ of the element height. According to some embodiments, comb portions 580 constitute the remainder of the element height. According to some embodiments, comb portions 580 may be between 0.1 and 0.3 inches tall and preferably between 0.15 and 0.2 inches tall. According to certain embodiments, the distance from the outer edge of the capacitive coupling portion 590 of signal ear 516 to the outer edge of the capacitive coupling portion 590 of ground ear 518 may be between 0.15 inches and 0.30 inches and preferably between 0.2 and 0.25 inches. According to certain embodiments, these values are scaled up or down for a desired frequency bandwidth. For example, arrays designed for lower frequencies are scaled up (larger dimensions) and arrays designed for higher frequencies are scaled down (smaller dimensions).

Relaxed Lattice Spacing

As discussed above with respect to FIGS. 2A-C and FIGS. 3A-C, the capacitive coupling between a ground ear and a clustered pillar can have an impact on the spacing of radiating elements in the phased array. The capacitive coupling between a radiating element (such as a signal ear or ground ear) and a clustered pillar can be used to improve the impedance matching of the antenna. As discussed above, the capacitive coupling between a clustered pillar and a radiating element can be a function of the surface overlap of the pillar and radiating element, as well as the width of the gap between the pillar and radiating element. Thus, by changing the shape of the clustered pillar or the shape of the radiating element, the capacitive coupling can be increased or decreased.

As discussed above, the impedance matching of the antenna has a substantial effect on the performance of the antenna. Thus, if the shape of the radiating element or the clustered pillar is changed so as to increase the surface overlap between the radiating element and the clustered pillar (i.e., increase the coupling between the two elements), the gap between the elements can be increased in order to maintain the impedance matching. By increasing the gap between the elements, less elements can be used in the array, while maintaining performance.

Figure 9B:
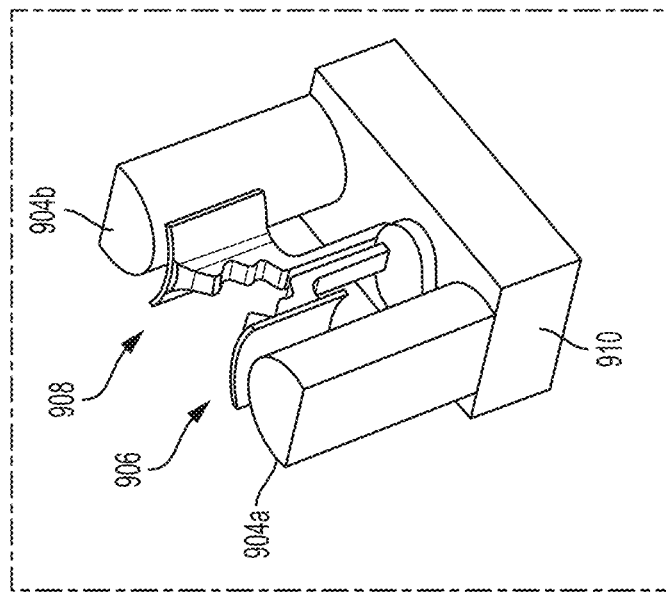
FIGS. 9A-B illustrates a phased array and corresponding unit cell in which the components are shaped so as to provide increased coupling between a clustered pillar and the radiating element according to examples of the disclosure.
Figure 9A:
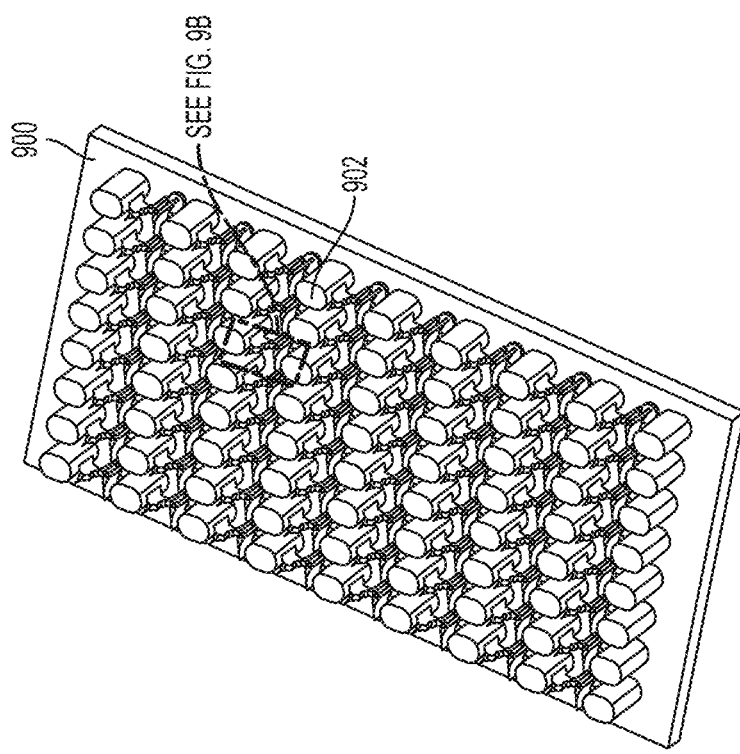

FIG. 9 illustrates a unit cell in which the components are shaped so as to provide increased coupling between a clustered pillar and the radiating element according to examples of the disclosure. In the example of FIG. 9, phased array 900 can include a plurality of unit cells 902. Each unit cell 902 can include a clustered pillar 904a-b, a signal ear 906, a ground ear 908, and a base plate 910. It should be understood that illustrations of unit cell 902 illustrated in FIG. 9 truncate clustered pillars 904a-b for illustrative purposes only. In the example of FIG. 9, the phased array is shown in a single pole configuration, meaning the antenna is configured to receive signals in a single polarization. A phased array that receives in a single polarization can be useful in scenarios in which the targets of interests are transmitting along one coordinate plane such as the horizon, thus only requiring the azimuth to be scanned by the phased array.

The components of the unit cell 902 (i.e., the base plate 910, the ground clustered pillars 9a-b, the signal ear 906 and the ground ear 908) can be manufactured from the same materials, and operate in substantially the same ways as discussed above with respect to the phase array antennas of FIGS. 2A-C and FIGS. 3A-C. A difference (as further discussed below) between the phased array antenna of FIGS. 2A-C, FIGS. 3A-C, and the antenna of FIG. 9 is the shape of the clustered pillars 904a-b, the shape of signal ear 906, and the shape of the ground ear 908.

FIGS. 10A-C illustrate an isometric, side, and top view of a unit cell of a phased array according to examples of the disclosure. As discussed with respect to FIG. 9, the unit cell 1000 illustrated in FIGS. 10A-C, can represent a single-pole configuration wherein the unit cells can be arranged on a lattice of the phased array in a first polarization axis (i.e., either horizontally or vertically polarized). Like the example of FIG. 9, unit cell 1000 can include a base plate 1010, clustered pillars 1004a-b, ground ear 1008, and signal ear 1006. Also illustrated in the figure is plug 1012. As discussed in further detail below, the signal ear 1006 can be overmolded into plug 1012 and then then inserted into base plate 1010.

Turning to FIG. 10C (i.e., the top view of unit cell 1000), the shape of the signal ear 1006 and the ground ear 1008 can be best viewed. As illustrated in FIG. 10C, ground ear 1008 can include an overlapping portion 1014 whose surface area is oriented to face clustered pillar 1004a. The surface area of overlapping portion 1014 can be oriented with respect to clustered pillar 1004a, so as to "wrap around" the clustered pillar 1004a. In other words, the overlapping portion 1014 can be configured to maximize the surface area of the ground ear 1008 that is facing the clustered pillar 1004a. By orienting the overlapping portion 1014 in this manner, the amount of capacitive coupling between clustered pillar 1004a and ground ear 1008 can be maximized.

Signal ear 1006 can also include an overlapping portion 1016 that can be oriented with respect to clustered pillar 1004b so as to "wrap around" the clustered pillar 1004b. In this way, the surface area of the signal ear 1006 that is facing the clustered pillar 1004b can be maximized thereby maximizing the capacitive coupling between the clustered pillar 1004b and the signal ear 1006.

Figure 11:
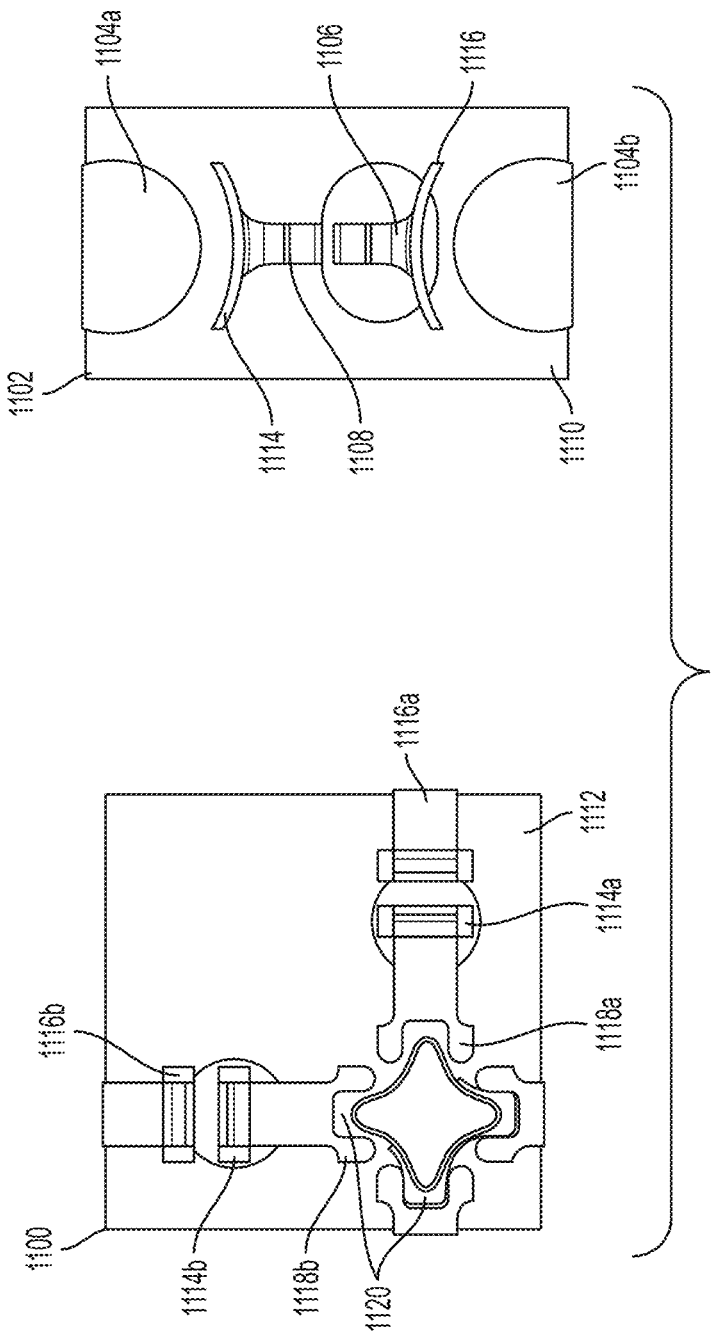
FIG. 11 illustrates a phased array in which the pillars and grounds ears of the radiating elements are integrated into the base plate, and the signal ear is overmolded according to examples of the disclosure.

FIG. 11 illustrates a comparison between the top view of the unit cell described with respect to FIGS. 3A-C, and the top view of the unit cell described with respect to FIGS. 10A-C. As discussed in detail above, with respect to FIGS. 3A-C, unit cell 1100 can include a base plate 1112, a plurality of signal ears 1114a-b, a plurality of ground ears 1116a-b, and a ground clustered pillar 1120. Also as discussed in detail above, the unit cell 1100 is configured to operate as a dual pole phased array (i.e., the antenna is scanned in two orthogonal coordinate planes). Unit cell 1102 can include a base plate 1110, a signal ear 1106, a ground ear 1114, and a ground clustered pillar 1120. Furthermore, as discussed in detail above, the unit cell 1102 is configured to operate as a single pole phased array (i.e., the antenna is scanned along a single coordinate plane).

In comparing unit cell 1100 and unit cell 1102, the differences between the shapes of the ground clustered pillars 1120 and 1104a-b can be readily apparent. For example, whereas ground clustered pillar 1120 is cross-shaped to allow for the coupling of elements oriented in two orthogonal positions, the ground clustered pillars 1104a-b are cylindrically shaped. Furthermore, the signal ears 1114a-b of unit cell 1100 and signal ears 1106 can be shaped differently. With respect to unit cell 1100, the signal ears 1114a-b are shaped to create an interdigitated capacitance between each signal ear and one arm of the cross-shaped ground clustered pillar 1120. Specifically, the signal ears 1114a-b, contain overlapping portions 1118a-b respectively, that are shaped to conform to the shape of the ground clustered pillar 1120, thereby maximizing the surface area of the signal ear that is directly facing the ground clustered pillar.

In comparison, unit cell 1102 includes a signal ear 1106 with overlapping portion 1116 that can be shaped to maximize the surface area that is overlapping (i.e., "wrapping around") the ground clustered pillar 1104a as discussed in detail above. The difference in the shape between ground clustered pillar 1120 and ground clustered pillars 1104a-b as well as the difference in the signal ears 1114a-b and signal ear 1106 can mean that the capacitive coupling between signal ear 1106 and ground clustered pillar 1104b can be greater than the capacitive coupling between ground clustered pillar 1120 and signal ears 1114a-b (assuming the gap between the signal ears and the ground clustered pillars are the same).

Since the capacitive coupling is greater for unit cell 1102 as compared to 1100, in order to maintain impedance matching (as discussed above), the gap between the overlapping portion 1116 of signal ear 1106 and the ground clustered pillar 1104b can be increased. This in turn can mean that each unit cell 1102 in a phased array can be further apart from one another. As an example whereas a phased array utilizing a unit cell 1100 may have adjacent unit cells spaced $\lambda/2 \times \lambda/2$ apart from one another (wherein $\lambda$ is equal to the maximum wavelength of the desired bandwidth) thereby requiring a 16×16 element array with an aperture of 4.75"×4.75"×0.5", a phased array utilizing a unit cell 1102 may have adjacent unit cells spaced $\lambda/2 \times 0.9\lambda$ apart from one another thereby requiring only a 16×8 element array.

The benefits of a phased array design that can maintain aperture size and bandwidth capabilities with fewer unit cells are readily apparent. Fewer elements can lower the overall weight of the phased array, while also lowering power requirements and the overall footprint of the phased array.

Overmolding of Radiating Elements

Mechanical failures can be problematic for a phased array antenna, since often times a phased array antenna can be subjected to high vibration environments that can potentially cause adjacent radiating elements to contact the ground clustered pillars or to cause connections between parts of a unit cell to break off or become damaged.

Referring to the example of FIG. 4, and as discussed above, signal ear 416 and ground ear 418 can be assembled to plug 428. Plug 428 may be formed of a dielectric material, such as plastic, in order to maintain the electrical isolation of signal ear 416 from ground ear 418 and base plate 414. As further discussed above, signal ear 416 and ground ear 418 can be inserted into receptacles in plug 428. In some embodiments, plug 428 can be molded around signal ear 416 and ground ear 418 in a process called overmolding. Both the signal and ground ears can be overmolded and then inserted into the phased arrays base plate 414.

While overmolding the signal ear and ground ear in the manner described above can lead to more efficient manufacturing of the unit cell, overmolding can also introduce a source of potential mechanical failure due to the vibration environment of phased arrays described above. The signal ear and ground ear, by being overmolded can suffer mechanical failure during vibration of the unit cell in the phased array. Furthermore, and as discussed below in detail, when both the signal ear and the ground ear are overmolded, in some embodiments, the ground ear can be press fit to make the required contact with the base plate of the array. Utilizing a press fit to ensure electrical connection between the ground ear and the base plate can lead to an increased risk of electrical discontinuity between the two components.

Recognizing that the ground ear needs to be connected to the ground, while the signal ear is to be isolated from the ground, instead of overmolding both the ground ear and the signal ear, if one or more of the radiating elements can be directly connected to elements with the base plate 414, the risk of mechanical and electrical failure of the array can be decreased.

FIGS. 12A-B illustrate a phased array in which the pillars and grounds ears of the radiating elements are integrated into the base plate, and the signal ear is overmolded according to examples of the disclosure. Turning to FIG. 12a, the unit cell 1200 can include the same components as described above with respect to FIGS. 2A-C. Unit cell 1200 can include base plate 1204, ground clustered pillar 1202a-b, ground ear 1210, and signal ear 1206. These components can operate in substantially the same way as their counterparts described with respects to FIGS. 2A-C. As shown in the example of FIG. 12, the signal ear 1206 can be overmolded and fit into plug 1208. Plug 1208, with the signal ear 1206 inserted into it, can be plugged into the base plate 1204. Ground ear 1210 can be directly connected to the base plate 1204. In contrast to the example described with respect to FIGS. 4a-b, wherein both the signal ear 416 and the ground ear 418 are overmolded into plug 428, in the example of FIGS. 12a-b, only the signal ear 1206 may be overmolded into plug 1208, while ground ear 1210 can be connected directly to the base plate 1204.

In this way, the ground ear 1210 can be directly connected to ground (since as described above the base plate 1204 is grounded), while the signal ear 1206 can be electrically isolated from the base plate components via the plug 1208. The signal ear 1206 can be electrically isolated from the base plate 1204 via the plug 1208, because just as the plug 428 in the example of FIGS. 4a-b, the plug 1208 may be formed of a dielectric material, such as plastic, in order to maintain the electrical isolation of signal ear 1206 from ground ear 1210 and base plate 1204. Plug 1208 may be formed from various plastics such as ABS, Nylon, PA, PBT, PC, PEEK, PEK, PET, Polyimides, POM, PPS, PPO, PSU, or UHMWPE. In some embodiments the plug 1208 can be formed for polyethermide (PEI), a high-performance, high-temperature plastic, that can achieve the required impedance matching to maintain the performance of the phased array. FIG. 12a illustrates the unit cell 1200 with the signal ear 1206 and plug 1208 detached from the unit cell. FIG. 12b illustrates the same unit cell with the plug 1208 "plugged in" to the base plate 1204.

The ground ear 1210 can be integrated into the base plate 1204 by utilizing a two-step machining process according to examples of the disclosure. The first step can include utilizing computer numerical control (CNC) milling to remove material from an aluminum piece so as to form the base plate and ground ear out of a single block of metal. The second step can include utilizing wire electrical discharge machining (wire EDM) to finely carve out the remaining ground ear features that are too fine to be carved out by the milling process.

By overmolding only the signal ear 1206, and connecting the ground ear 1210 directly to the base plate 1204, the number of locations for possible mechanical failure (e.g., electrical discontinuity) can be reduced since fewer components are susceptible to the mechanical risks associated with attaching components via overmolding.

Flexible Connectors

While reducing the number of components of a unit that are inserted into the base plate via overmolding can reduce the risk of mechanical failure during the operation or deployments of a phased array antenna, the connections between the unit cells of the phased array and any downstream electronics can present a risk of mechanical failure, especially in a high vibration environment.

Figure 13:
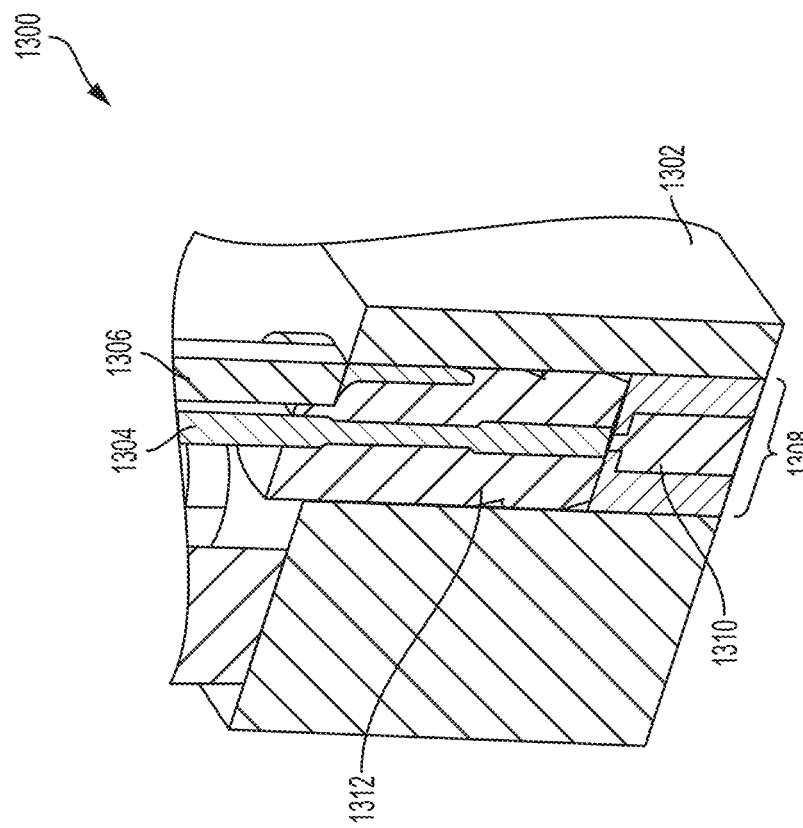
FIG. 13 illustrates the feeding structure of the radiating element in the base plate of the phased array configured to be mated with a coaxial connector according to examples of the disclosure.

FIG. 13 illustrates an exemplary feeding structure of the radiating element in the base plate of the phased array configured to be mated with a coaxial connector according to examples of the disclosure.

FIG. 13 illustrates a cross-section of a unit cell 1300 wherein the connection between a signal ear 1306 and a SMA connector 1308 is visible. Similar to the examples discussed above, signal ear 1304 can be connected to the unit cell 1300 via plug 1312 and provide an electrically isolated path for the signal ear 1306 to make electrical contact with SMA connector 1308. SMA connector 1308 can include a conductive portion 1310 that when contacted by signal ear 1304 can provide a closed electrical connection between the signal ear and any downstream electronics connected to the co-axial cable associated with the SMA connector.

While the connection between the signal ear 1304 and the SMA connector 1308 can generally be maintained during normal operation of the phased array, the antenna array may be subject to vibration as described above. During vibration the connection between SMA connector 1308 and signal ear 1304 may become loose or may become disconnected entirely thereby negatively impacting the performance of the phased array. Since the signal ear 1304 and the conductive portion 1310 of SMA connector 1308 are both made of rigid metal material, they can be especially susceptible to an interruption of connection caused by vibration.

Since rigid connections between conductive elements may be susceptible to mechanical failure especially in environments that experience vibration such as the environment that a phased array may operate or be deployed, flexible connectors may provide improved reliability and reduce the risk of mechanical failure of the connection. For example, flexible connectors can dampen vibration, which in turn can improve the overall mechanical reliability of electrical connections in the phased array.

Thus, rather than relying on direct contact between the rigid bodies of the signal ear 1304 and the conductive portion 1310 of SMA connector 1308, an intervening flexible connector may provide a more reliable solution that is less prone to mechanical failure.

As an example, rather than directly connecting the signal ear 1304 with SMA connector 1308, an intervening flexible connector that can withstand a vibration environment can be employed to reduce the risk of mechanical failure of the connection in a vibration environment.

A Zebra® connector designed by Fujipoly is an example of an elastomeric connector that can be employed to reduce the risk of mechanical failure. A Zebra connector can include alternating and insulating regions in a rubber or elastomer matrix that can be configured to produce overall anisotropic conductive properties. Because of their flexibility, Zebra connectors can create a gasket-like seal between rigid connections and can excel in shock and anti-vibration applications owing to the flexibility of the connector. The conductive material in a Zebra connector can include carbon, silver, and gold.

Figure 14B:
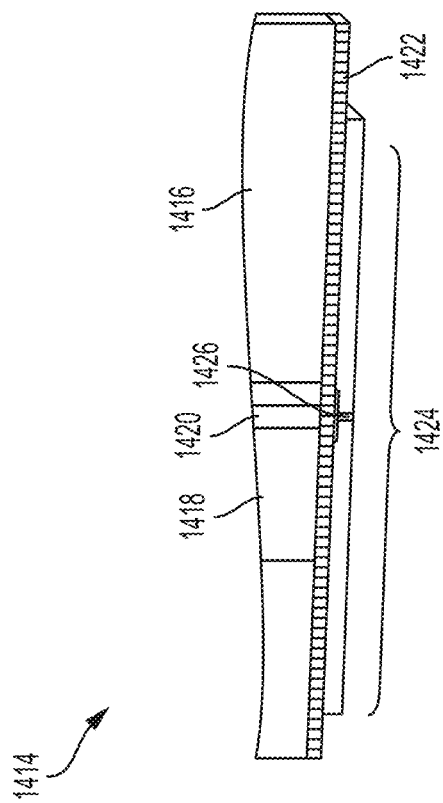
FIGS. 14A-B illustrate an exemplary feeding structure of a radiating element in the base plate of the phased array configured to be mated with an elastomeric gasket according to examples of the disclosure.
Figure 14A:
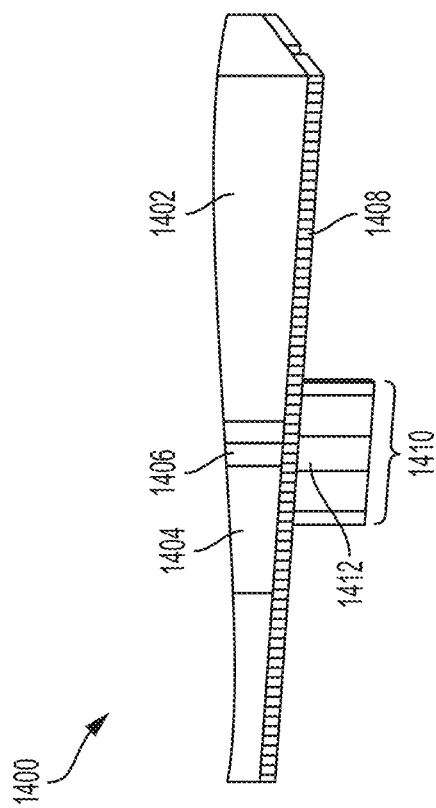

FIGS. 14A-B illustrate an exemplary feeding structure of a radiating element in the base plate of the phased array configured to be mated with an elastomeric gasket according to examples of the disclosure. FIG. 14A illustrates an exemplary connection between a signal ear and a co-axial cable employing a SMA connector that employs an elastomeric connector according to examples of the disclosure. Similar to the example of FIG. 13, in FIG. 14A, a unit cell 1400 can include a base plate 1402, a signal ear 1406 that is overmolded into a plug 1404. The plug 1404 can electrically isolate the signal ear 1406 from the base plate 1402, and can allow the signal ear 1406 to extend down into the base plate to make an electrical connection to SMA connector 1410. SMA connector can include a conductive portion 1412. In contrast to the example of FIG. 13, in the example of FIG. 14A, rather than directly connecting the signal ear 1406 to the conductive portion 1412 of the SMA connector 1410, an elastomeric conductor 1408 can be inserted between the signal ear 1406 and SMA connector 1410. The elastomeric conductor 1408, as described above, can provide a flexible conductive pathway between the signal ear 1406 and the conductive portion 1412 of SMA connector 1410.

FIG. 14B illustrates an exemplary connection between a signal ear and a printed circuit board (PCB) that employs an elastomeric connector according to examples of the disclosure. As illustrated in FIG. 14B, PCB connections can allow for a high-density spacing of connections in contrast to RF connectors. The unit cell 1414 of FIG. 14B can include the same components as the example of FIG. 14A including a base plate 1416, plug 1418, signal ear 1420 and an elastomeric connector 1422 that all are configured to operate identically to their counterparts discussed above. In the example of FIG. 14B, rather than connecting to a co-axial cable, the signal ear can be connected to a PCB circuit 1424 that can include a connector 1426. Connector 1426 can make electrical contact with elastomeric connector 1422, which can then complete an electrical path between the signal ear 1420 and the PCB circuit 1424.

Figure 15:
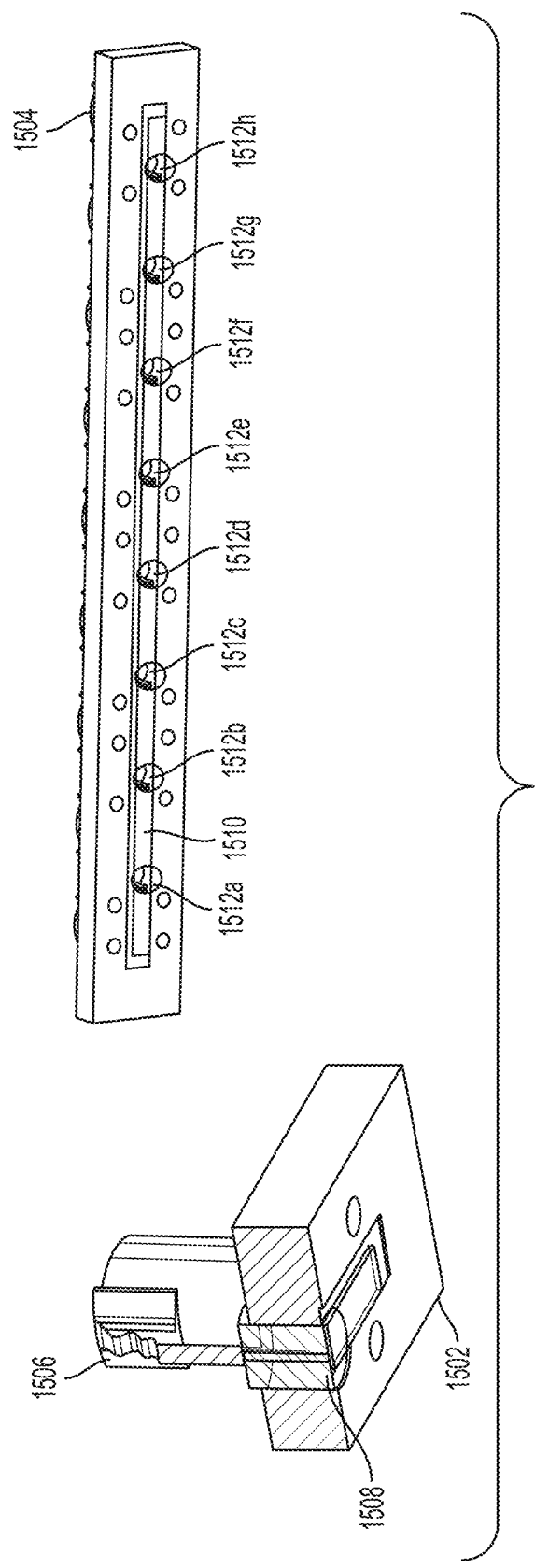
FIG. 15 illustrates an embodiment of the interface at the base plate to install the elastomeric gasket according to examples of the disclosure.

FIG. 15 illustrates a plurality of unit cells with a common elastomeric connector according to examples of the disclosure. FIG. 15 illustrates a view underneath one unit cell 1502, and a view from underneath a plurality of unit cells 1504. As shown in the figure, a elastomeric connector strip can be disposed underneath the unit cell 1502 such that it can make contact with the stem of signal ear 1506 that can protrude underneath plug 1508. Turning to the plurality of unit cells 1504, an elastomeric strip 1510 can be disposed underneath the plurality of unit cells 1504 such that the elastomeric strip can make contact with a plurality of signal ear holes 1512a-h. Each signal ear hole 1512a-h can receive a signal ear (inserted into a plug) such that when the signal ear is plugged into the hole 1512, the stem of the signal ear can make contact with elastomeric strip 1510.

In additional embodiments of the disclosure, instead of employing an elastomeric connector, the unit cell can employ a RF interposer such as a Fuzz Button® connector that can connect an SMA connector or PCB circuit Board. Fuzz Buttons® are compressible contact pins made up of highly specialized very fine wire that can be wound up into a cylinder of customizable size. A Fuzz Button® connector, in which the conductive element that conducts a signal between two electrical connections, can employ a spring-like connector that can withstand a high-vibration environment while minimizing the risk of mechanical failure in much the same way as an elastomeric connector can. Fuzz Buttons® can be employed to make contacts for the phased array due to the Fuzz Buttons'® small size (the small size allows them to fit in available spacing). They are flexible connectors that can ensure a good electrical connection, while remaining versatile enough to be used with either an SMA or PCB connector. Because they are highly conductive, they can preserve signal integrity. Furthermore Fuzz Buttons® have been verified to operate at the operational frequencies used by the phased array and detailed above.

FIG. 16A illustrates an exemplary connection between a signal ear and a co-axial cable employing a SMA connector that employs a Fuzz Button® RF interposer according to examples of the disclosure. Similar to the example of FIG. 13, in FIG. 16A, a unit cell 1600 can include a base plate 1602, a signal ear 1606 that is overmolded into a plug 1604. The plug 1604 can electrically isolate the signal ear 1606 from the base plate 1602, and can allow the signal ear to extend down into the base plate 1602 to make an electrical connection to SMA connector 1610. SMA connector 1610 can include a conductive portion 1612. In contrast to the example of FIG. 15, in the example of FIG. 16A, rather than directly connecting the signal ear 1606 to the conductive portion 1612 of the SMA connector 1610, a Fuzz Button® connector 1608 can be inserted between the signal ear 1606 and SMA connector 1610. The Fuzz Button® connector 1608, as described above can provide a flexible conductive pathway between the signal ear 1606 and the conductive portion 1612 of SMA connector 1610.

FIG. 16B illustrates an exemplary connection between a signal ear and a printed circuit board (PCB) that employs a Fuzz Button® connector according to examples of the disclosure. The unit cell 1614 of FIG. 16B can include the same components as the example of FIG. 16A including a base plate 1616, plug 1618, signal ear 1620 and an Fuzz Button® connector 1622 that all are configured to operate identically to their counterparts discussed above. In the example of FIG. 14B, rather than connecting to a co-axial cable, the signal ear can be connected to a PCB circuit 1624 that can include a Fuzz Button® connector 1626. Fuzz Button® connector 1626 can make electrical contact with Fuzz Button® connector 1622, which can then complete an electrical path between the signal ear 1620 and the PCB circuit 1624.

All Metal Design

While the phased array antenna embodiments described above can receive a wide-bandwidth low-profile signal, they may present manufacturing challenges that can make the process of producing and assembling the array challenging. As an example, with respect to the phased array discussed above with respect to FIGS. 9-16, the process of manufacturing such an array can involve machining various components separately and then assembling the components to produce a unit cell of the phased array.

Referring back to FIG. 4, signal ear 416 and ground ear 418 can be assembled into plug 428, which as described above can be formed of a dielectric material such as plastic in order to maintain the isolation of signal ear 416 from ground ear 418 and base plate 414. Also as described with respect to FIG. 4, plug 428 can be molded around signal ear 416 and ground ear 418 in a process called overmolding. While such a configuration can lead to a more efficient manufacturing of the unit cell, nonetheless the process can require that the signal ear, ground ear, base plate, and plug be manufactured separately and then assembled together to generate a unit cell of the phased array. The process can therefore require a more complex and time consuming manufacturing process because the components are separately manufactured and then assembled.

However, a unit cell in which the base plate, signal ear, and ground ear can be created from a single piece of conductive material (i.e., metal) could lead to a manufacturing process that requires less complexity and requires minimal assembly. Using the example of metal, a phased array configuration that can allow for the base plate, ground ear and signal ear to be created from a single piece of metal can be produced by additive manufacturing techniques that can reduce the complexity and time required to engage in the manufacturing process.

Additive manufacturing can refer to processes in which a common material is joined or solidified under computer control to create an object, with material being added together is a specific way to create the object. By configuring the base plate, signal ear, and ground ear to be manufactured in one piece using a common material, the entire unit cell of a phased array can be manufactured in a single process rather than having to be manufactured as separate components. Such a process can reduce the time and complexity required to manufacture a phased array which can include hundreds or thousands of unit cells.

Figure 17B:
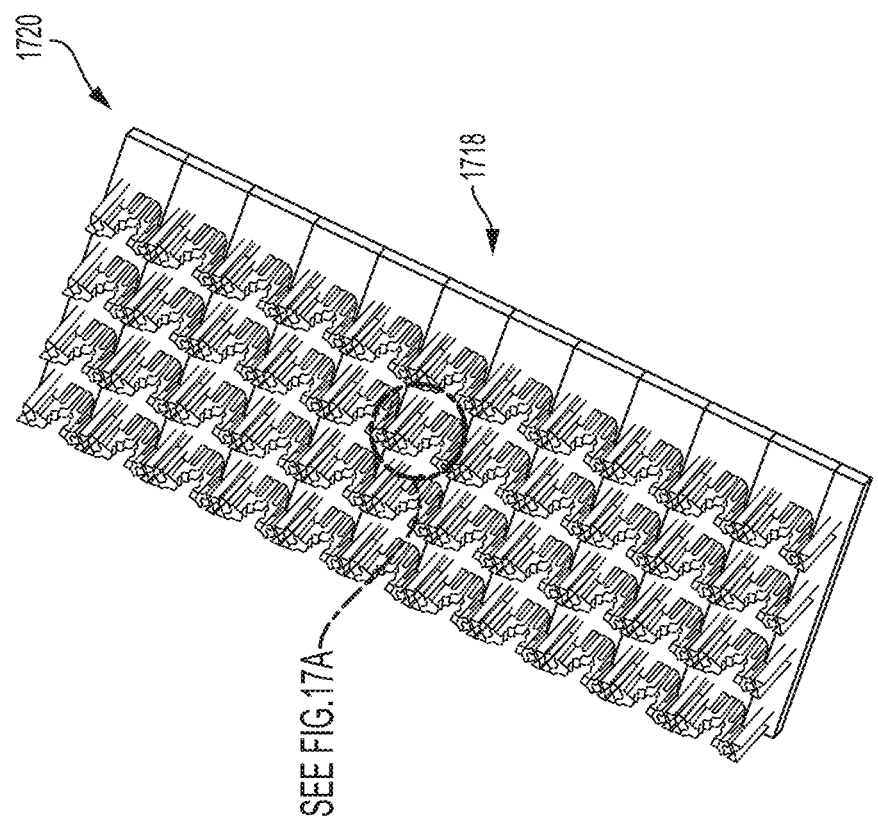
FIG. 17A-B illustrates a phased array and corresponding unit cell in which the components are formed from a single material so as to utilize an additive manufacturing process according to examples of the disclosure.
Figure 17A:
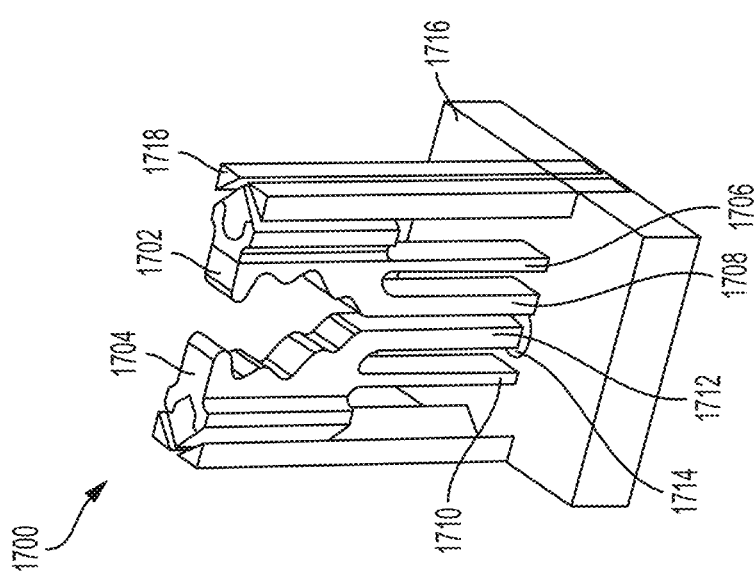

FIG. 17A-B illustrates a phased array and corresponding unit cell in which the components are formed from a single material so as utilize an additive manufacturing process according to examples of the disclosure. Referring to FIG. 17A, the phased array can include a unit cell 1700 that includes a ground ear 1702, a signal ear 1704, and a base plate 1716 that are configured to operate in substantially the same manner as described above with respect to their counterparts described with respect to FIGS. 9-16. However, rather than being configured such that each individual component is required to be separately manufactured, the unit cell 1700 can be configured such that the signal ear 1704, ground ear 1702, and base plate 1716 can be manufactured as a single continuous object from a common material such as metal.

In the example of FIG. 17A, the ground ear 1702 can include two support posts 1706 and 1708 that are integrated directly into the base plate 1716. In other words the base plate 1716 and the ground ear 1702 can be fabricated from a common metal piece and are connected to one another by virtue of the contact between posts 1706 and 1708 of the ground ear 1702. As described above, the base plate 1716 can be electrically grounded, and as posts 1706 and 1708 of the ground ear 1702 are integrated directly into the base plate, they too are provided with a path to ground.

The signal ear 1704, in order to be symmetric to the ground ear 1702, can also include two support posts 1710 and 1712. Similar to ground ear 1702, support post 1710 can be directly integrated into base plate 1716 thereby providing a direct path to ground for the signal ear 1704. However, if post 1712 were also to be directly integrated into the base plate 1716 (similar to post 1708), then the signal ear 1704 would be completely shorted to ground thereby rendering the signal ear inoperable to act as a receiving or transmitting element in a phased array antenna. Therefore as discussed in further detail below, post 1712 can be inserted into an airgap 1714 that can be intentionally created within base plate 1716 so as to avoid grounding the signal ear 1704. The airgap can be shaped in the manufacturing process so as to match the impedance of the signal ear thereby ensuring minimum impacts from signal reflection during operation of the phased array. By inserting the post 1712 into an airgap 1714, the unit cell 1700 may no longer require any overmolding of the post 1712 to avoid grounding the post, since the airgap can be of sufficient dimeter to ensure that during operation of the phased array antenna the post 1712 does not make contact with the base plate 1716. Because the signal ear 1704 includes a post 1712 that can be inserted into an airgap 1714 of the base plate 1716, the other post 1710 can provide mechanical support to the signal ear 1704 to ensure that it remains attached to the phased array during operation. As shown in the figure, the shape of the signal ear 1702 and the ground ear 1704 can be specifically configured to optimize the input impedance of the antenna.

The unit cell 1700 can also include one or more clustered pillars 1718, similar to the example unit cells discussed above. Discussed in further detail below, the clustered pillars 1718 can be shaped with respect to the signal ear 1704 and ground ear 1702 so as to control the capacitive coupling between adjacent elements in the phased array, thereby allowing for good impedance matching at the lower-frequency end of the bandwidth, and thereby effectively increasing the operational bandwidth of the unit cell 1700. FIG. 17B illustrates a phased array antenna that utilizes the unit cell of FIG. 17A. The phased array 1720 can include a plurality of unit cells 1700 to form a full array.

Figure 18B:
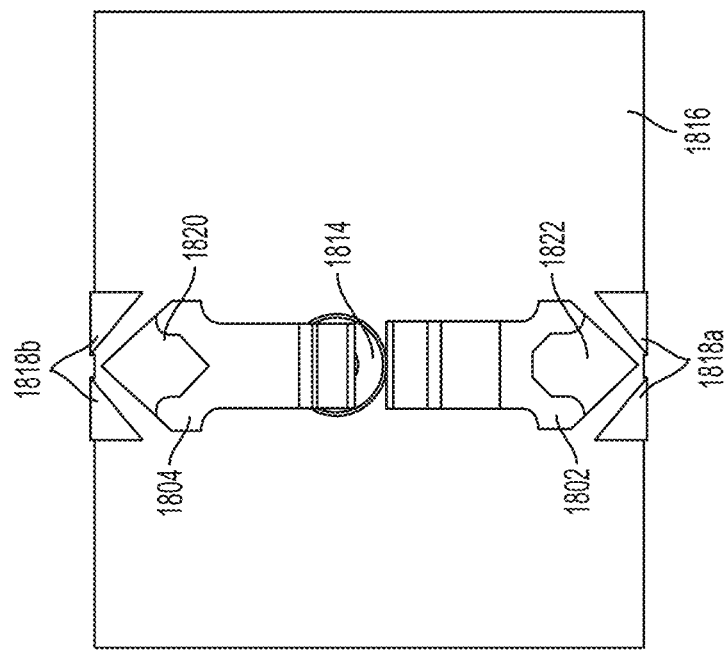
FIG. 18B illustrates a top view of an exemplary all-metal unit cell of a phase array antenna according to examples of the disclosure.
Figure 18A:
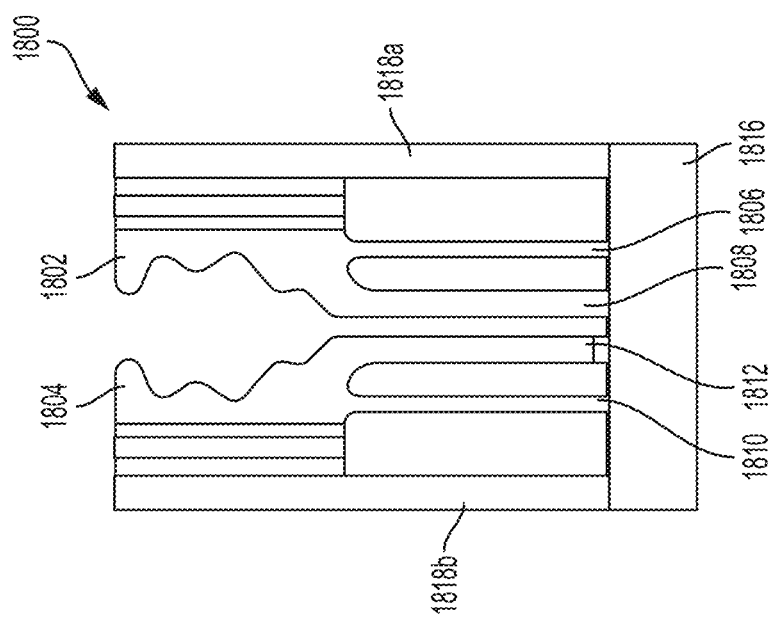
FIG. 18A illustrates a side view of an exemplary all-metal unit cell of a phased array antenna according to examples of the disclosure.

FIG. 18A illustrates a side view of an exemplary all-metal unit cell of a phased array antenna according to examples of the disclosure. The side-view illustrated in FIG. 18A corresponds to the unit cell described with respect to FIG. 17A. In the view of FIG. 18A, it can be seen that the signal ear 1804 and the ground ear 1802 are symmetric with respect to one another. The signal ear 1804 includes posts 1810 and 1812, while ground ear 1802 includes posts 1806 and 1808. As discussed above, posts 1806, 1808, and 1810 can be integrated with the base plate 1816 directly, while post 1812 can be inserted into an airgap created in the base plate 1816.

As in FIG. 18, the unit cell 1800 can also include clustered pillars 1818a and 1818b. The clustered pillars 1818a and 1818b can be configured to maximize the electromagnetic coupling between adjacent unit cells thereby improving the performance of the phased array overall. As discussed further below, the signal ear 1804 and the ground ear 1802 can also be shaped to present the maximum surface area for interacting with the clustered pillars 1818a and 1818b.

The side view presented in FIG. 18A illustrates the symmetry between the signal ear 1804 and ground ear 1802. The symmetry between the two components can make it easier to tile the phased array (i.e., tile the unit cell on a common base plate 1816) during the manufacturing process, thereby reducing the complexity of the manufacturing process.

FIG. 18B illustrates a top view of an exemplary all-metal unit cell of a phase array antenna according to examples of the disclosure. The top view presented in FIG. 18B can correspond to the unit cell described in both FIGS. 17A and 18A. The top view of FIG. 18B more clearly illustrates the airgap 1814 that is configured to accept post 1812 of signal ear 1804. As discussed above with respect to FIG. 17, the airgap 1814 can be intentionally created within base plate 1816, so that it can receive post 1812 of signal ear 1804 without allowing the post to make contact with the base plate. In contrast to post 1810 of signal ear 1804 which is directly integrated and makes contact with the grounded base plate 1816, the post 1812 can be directly connected to an interface, such as a coaxial cable or PCB interface (discussed in further detail below), without making contact with the base plate 1816. The airgap 1814 can facilitate this configuration by ensuring that the clearance between the signal ear post 1812 and the base plate 1816 is sufficient to ensure that the signal post 1812 will not make contact with the base plate 1816 and will only make contact with the interface to a connector as described in further detail below.

The size of the airgap 1814 can be large enough to ensure that the post 1812 does not inadvertently make contact with the base plate during operation of the phased array antenna. If the diameter of the airgap is too small, then during operation of the phased array antenna, the signal ear post 1812 embedded into the airgap 1814 may vibrate and make intermittent contact with the base plate 1816 thus intermittently grounding the signal ear 1804 and thereby degrading the performance of the antenna. However, the size of the airgap 1814 can be further constrained by the ground ear 1802, and more specifically by the post 1808 of the ground ear. If the diameter of the airgap is too large, then the airgap may overlap with the area on the base plate that is supposed to be integrated with post 1808 thereby degrading the connection between the ground ear 1802 and the base plate 1816.

The diameter of the airgap 1814 can also be influenced by the impedance of the signal ear post 1812. In order to achieve suitable impedance matching between the base plate 1816 and the signal ear post 1812, the diameter of the airgap 1814 can be controlled to ensure that an impedance mismatch does not occur. As the impedance of the signal ear post 1812 is proportional to the diameter of the post itself, the ratio of the diameter of the signal post to the diameter of the airgap 1814 can be controlled so as to achieve suitable impedance matching.

In addition to more clearly illustrating the airgap 1814, the top view illustrated in FIG. 18B can also more clearly illustrate the geometric relationship between the clustered pillars 1818a and 1818b, and the signal ear 1802 and ground ear 1804. In the example of FIG. 18B, the clustered pillars 1818a and 1818b are shown as comprising two separate triangular portions. In such a configuration, the signal ear 1804 and ground ear 1802 can be include a triangle end portion 1820 and 1822 respectively. The triangle portions 1820 and 1822 and signal ear 1804 and ground ear 1802 can be shaped this way, so as to maximize the surface area of the signal ear and ground ear that is directly facing the clustered pillars 1818a and 1818b. By maximizing the surface area, the amount of capacitive coupling between the pillars can be controlled, thereby broadening the array's operational bandwidth. As described above, the shape of the ground ear 1802 and the signal ear 1804 (i.e., the portions that face the other ear) can be shaped so as to optimize the input impedance of the antenna.

In the example of FIGS. 17 and 18A-B the unit cell of the phased array antenna is shown as having triangular shaped clustered pillars and the signal and ground ears are shown having have triangular shaped ends so as to control the capacitive coupling between the clustered pillars and the radiating elements. The shape of the clustered pillars can be dependent on numerous factors. In the example of FIGS. 17 and 18A-B, the shape of the clustered pillars can be triangular (in contrast to the star-like shape shown in FIGS. 9-16) due to the changes in the configuration of the unit cell engendered by the all-metallic design.

Referring back to FIG. 18A, the fact that signal ear 1804 includes a metallic support post 1810 that is directly integrated into the base plate 1816 can create a need to change the shape of the clustered pillar 1818. Specifically, because the support post 1810 provides a direct path to ground via the base plate 1816, the bandwidth of the phased array that utilizes a plurality of unit cells 1800 may be negatively impacted. To account for this drop in bandwidth caused by the all-metal design, the shape of the clustered pillar 1818 can be altered so as to improve the capacitive coupling between the elements, thereby compensating for loss in bandwidth caused by the support post's 1810 contact with the base plate.

Though the all-metal design examples of FIGS. 17-18 illustrate triangular clustered pillars, the disclosure should not be seen as limiting and the clustered pillars can take on various shapes. As described above with respect to FIGS. 9-16, the clustered pillar was configured in a star shape, and the ends of the radiating elements were shaped accordingly to control the capacitive coupling between the elements in the array. In one or more examples of the disclosure, the unit cell of a phased array that utilizes an all-metal design can still utilize the same clustered pillars and radiating element shapes described above with respect to FIGS. 9-16.

Figure 19C:
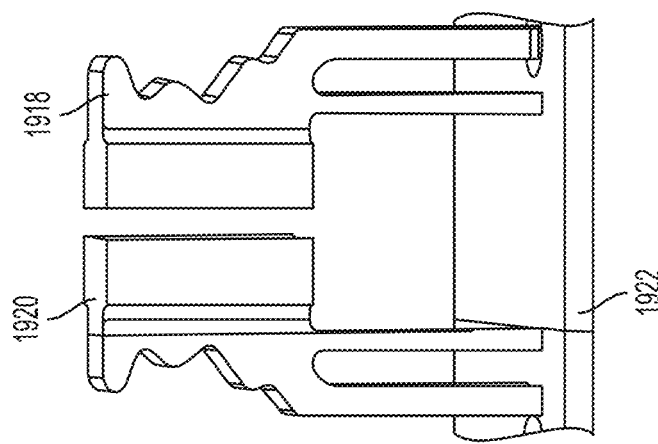
FIGS. 19A-C illustrate exemplary pillar configurations for a phased array antenna with all-metal unit cells according to examples of the disclosure.
Figure 19B:
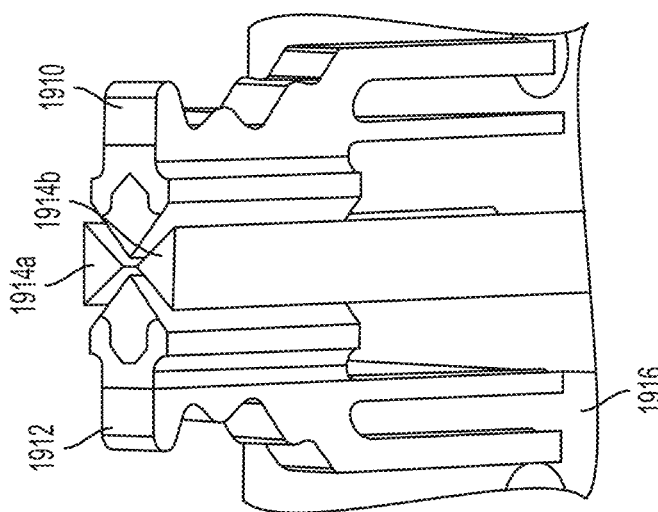
Figure 19A:
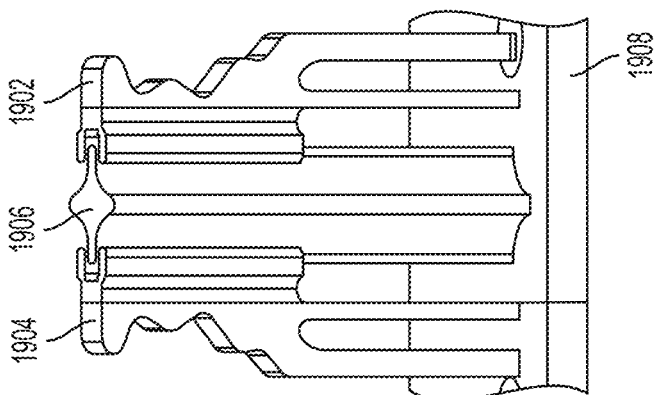

FIGS. 19A-C illustrate exemplary pillar configurations for a phased array antenna with all-metal unit cells according to examples of the disclosure. The example of FIG. 19A illustrates two separate halves of two separate unit cells. In the example of FIG. 19A, the electrical interaction between the signal ear 1902 of a first unit cell and the ground ear 1904 of a second unit cell is illustrated. As shown in the figure a "star-shaped" clustered pillar 1906 is disposed between the ground ear 1904 and the signal ear 1902. Also as illustrated in the figure, the shape of the end of the signal ear 1902 facing the pillar is configured to maximize the surface area of the signal ear exposed to the clustered pillar 1906. Similarly, the shape of the end of the ground ear 1904 is configured to maximize the surface area of the ground ear exposed to the clustered pillar 1906.

The phased array elements illustrated in FIG. 19A can be implemented using the all-metal design described above. As shown in the figure, the ground ear 1904 includes two metal posts that are directly integrated into the base plate 1908. The signal ear 1902 is shown as having two metal posts, with one post (i.e., the support post) being directly integrated into the base plate 1908, and with the other metal post being inserted into the base plate via an airgap as described above with respect to FIGS. 17-18.

FIG. 19B illustrates an exemplary phased array with a triangular clustered pillar according to examples of the disclosure. The example of FIG. 19B can include the same configuration of clustered pillars and radiating elements as discussed with respect to FIG. 18. In the example of FIG. 19B, the electrical interaction between the signal ear 1910 of a first unit cell and the ground ear 1912 of a second unit cell is illustrated. As shown in the figure a plurality of "triangle shaped" clustered pillars 1914a and 1914b are disposed between the ground ear 1912 and the signal ear 1910. The clustered pillars 1914a and 1914b can be disjointed meaning they can be disposed in the base plate 1916 as two separate pieces that are separately integrated with the base plate. Also as illustrated in the figure, the shape of the end of the signal ear 1910 facing the clustered pillars 194a-b is configured to maximize the surface area of the signal ear exposed to the clustered pillars. Similarly, the shape of the end of the ground ear 1912 is configured to maximize the surface area of the ground ear exposed to the clustered pillars 1914a-b.

The phased array elements illustrated in FIG. 19A can be implemented using the all-metal design described above. As shown in the figure, the ground ear 1912 includes two metal posts that are directly integrated into the base plate 1916. The signal ear 1912 is shown as having two metal posts, with one post (i.e., the support post) being directly integrated into the base plate 1916, and with the other metal post being inserted into the base plate via an airgap as described above with respect to FIGS. 17-18.

In one or more examples, the all-metal design described above can be implemented using a configuration that does not include any clustered pillars. Such a configuration can make manufacturing even less complex by not requiring the fabrication of a clustered pillar which can make tiling the phase array (i.e., assembling multiple unit cells onto a common base plate) less complex. Furthermore, a design that does not include a clustered pillar between unit cells can decrease the overall weight of the design because it may not require as much material to fabricate a unit cell.

FIG. 19C illustrates an all-metal phased array unit cell configuration without a clustered pillar according to examples of the disclosure. In the example of FIG. 19C, a signal ear 1918 of a first unit cell can be disposed adjacent to a ground ear 1920 of a second unit cell. The shapes of the signal ear 1918 and the ground ear 1920 can be configured to maximize the surface area of interaction between them. In other words, the shape of the signal ear 1918 can be configured so that the portion of the signal ear that is facing the ground ear 1920 can have the maximum surface area of exposure to the ground ear. Likewise, the shape of the ground ear 1920 can be configured so that the portion of the ground ear that is facing signal ear 1918 can have the maximum surface area of the exposure to the signal ear.

The "pillar-less" design illustrated in FIG. 19C can cause the phased array antenna to have less bandwidth capability, however as discussed above, the manufacturing complexity and weight of the overall phased array can be decreased as a result of removing the clustered pillar from each unit cell.

Figure 20:
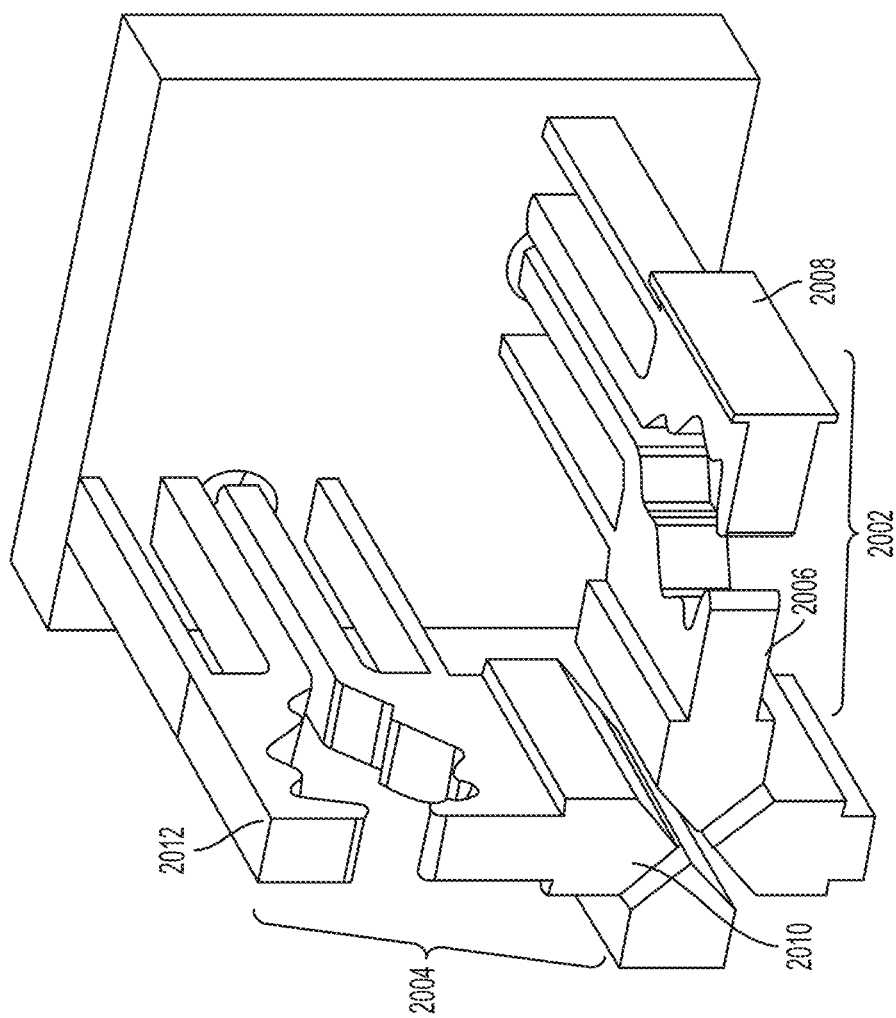
FIG. 20 illustrates an isometric view of a phased array antenna with all-metal unit cells and with a triangular clustered pillar configuration according to examples of the disclosure.

FIG. 20 illustrates an isometric view of a phased array antenna with all-metal unit cells and a "pillar-less" configuration according to examples of the disclosure. In the example of FIG. 20, a two unit cells 2002 and 2004 are oriented perpendicularly with respect to one another. Unit cell 2002 includes a signal ear 2006 and a ground ear 2008. Unit cell 2004 can be oriented perpendicularly to unit cell 2002 and can include a signal ear 2010 and a ground ear 2012. As the unit cells 2002 and 2004 are perpendicularly oriented with respect to one another, the signal ear 2006 of unit cell 2002 can be perpendicularly oriented and adjacent to the signal ear 2010 of unit cell 2004. Furthermore, the perpendicular orientation between unit cells can allow the phased array to be configured as a dual-polarization phased array meaning the phased array can send and receive signals in orthogonal polarizations (i.e, RHCP, LHCP, Vertical, Horizontal, etc.)

As illustrated in the figure, the phased array can be implemented without requiring any clustered pillars. In order to facilitate this configuration, the signal ears of each unit cell can be shaped so as to provide an optimal level of capacitive coupling between adjacent and perpendicular signal ears. In the example of FIG. 20, each signal ear includes a triangular shaped end piece that is shaped so as to provide the maximum amount of surface for capacitive coupling to its adjacent and perpendicular signal ear. Thus in the example of FIG. 20, signal ear 2006 can have a triangular end piece that is shaped so as to present an optimal amount of surface area to signal ear 2010 that is also shaped with an identical triangular end piece.

In the example of FIG. 20, each signal ear 2006 and 2010 can be shaped so as to optimize capacitive coupling with the two signal ears that are perpendicular to its position. For instance in the example of FIG. 20, signal ear 2006 can have a triangular end piece such that one side of the triangle can be capacitively coupled to signal ear 2010 which is oriented perpendicular to signal ear 2006 and another side of the triangle can be capacitively coupled to another signal ear (not pictured) that is also oriented perpendicularly to signal ear 2006.

In one or more examples, a phased array antenna may have an assortment of different clustered pillar arrangements and signal ear shapes on the same array. While such an arrangement may increase the manufacturing complexity of the phased array it can lead to various benefits including specific bandwidth capabilities that may be desirable.

Figure 21:
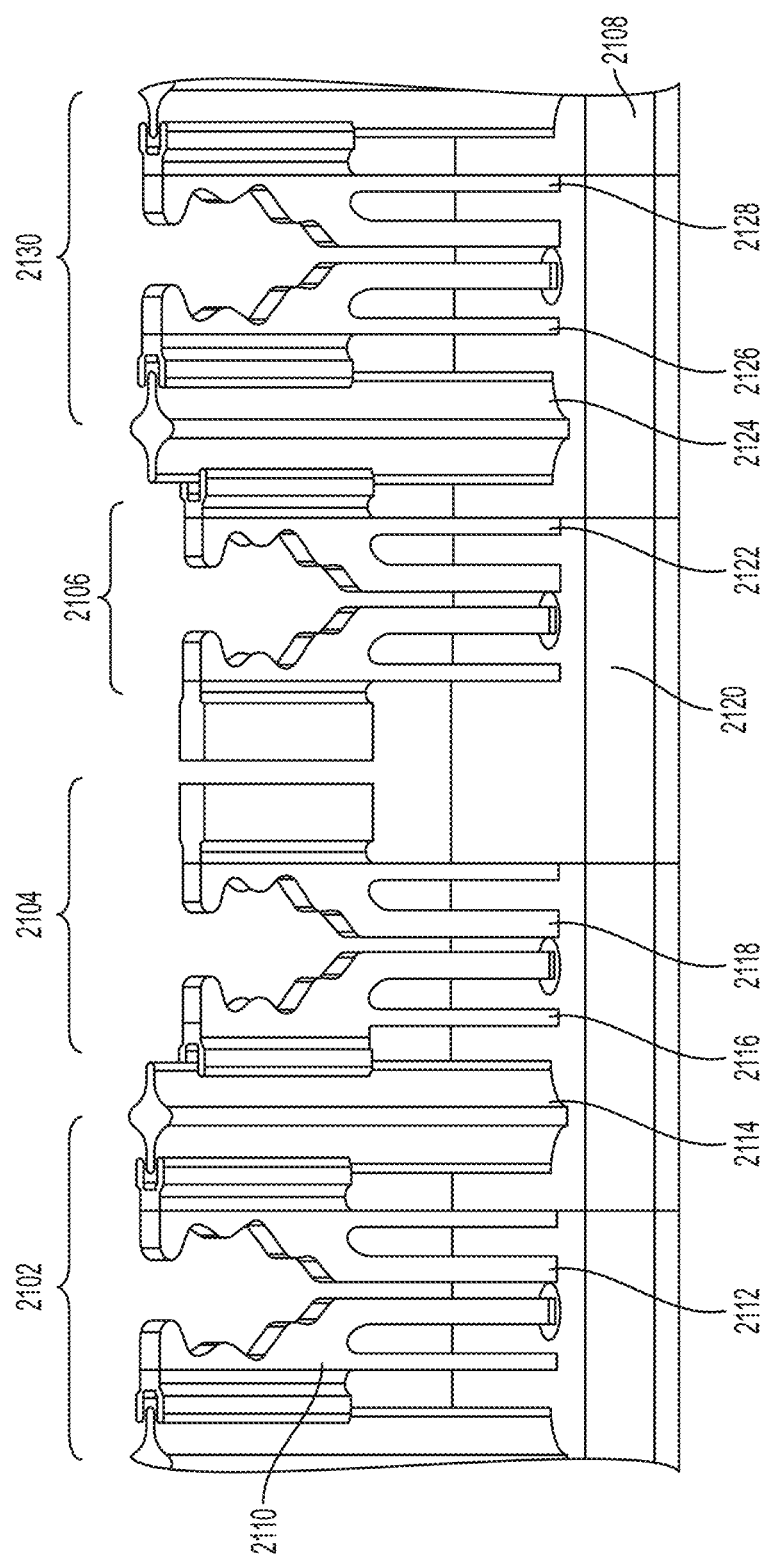
FIG. 21 illustrates a side view of a phased array antenna with all metal unit cells and with a mixed clustered pillar arrangement according to examples of the disclosure.

FIG. 21 illustrates a side view of a phased array antenna with all metal unit cells and with a mixed clustered pillar arrangement according to examples of the disclosure. The example of FIG. 21 illustrates 4 separate unit cells 2102, 2104, 2106, and 2130 on a common base plate 2108. Unit cell 2102 is illustrated as having a signal ear 2110 and a ground ear 2112. Ground ear 2112 can be shaped to interface with a clustered pillar 2114. Clustered pillar 2114 can be "star-shaped" as shown in the figure. Ground ear 2112 can be shaped to interface with the clustered pillar 2114 as described above.

Unit cell 2104 can include a signal ear 2116 that is shaped to interface with clustered pillar 2114. Unit cell 2104 can also include a ground ear 2118 that is shaped so as to not require a clustered pillar. As shown in the example of FIG. 21, unit cells 2104 and 2106 can be configured so that no clustered pillar is required to be disposed between them. Thus, the signal ear 2120 of unit cell 2106 can be shaped likewise so as to not require a clustered pillar. Unit cell 2106 can also include a ground ear 2122 that can be shaped to capacitively couple to a clustered pillar 2124 that is star-shaped. Unit cell 2130 can therefore include a signal ear 2126 that can also be shaped to capactively couple to clustered pillar 2124. Finally, unit cell 2130 can also include a ground ear 2128.

Thus, in the example of FIG. 21, the phased array can include multiple pillar types or no pillar at all between unit cells. Because such an arrangement can include radiating elements of varying size and shapes, some of the radiating elements (i.e., the larger elements) may exhibit improved band performance at lower frequency bands, while the smaller radiating elements may exhibit improved band performance at higher frequency bands. In this way, the overall bandwidth of the phased array may be increased by including mixed types of radiating elements and clustered pillars.

Referring back to the example of FIGS. 18A and 18B, the base plate 1816 can include an airgap 1814 that can accommodate a metallic post 1812 belonging to signal ear 1804. As described above, signal ear 1804 can be mated to a coaxial cable or PCB connection via the metallic post 1812 without making electrical contact with the base plate 1816 due to the creation of the airgap 1814 within the base plate 1816.

Figure 22:
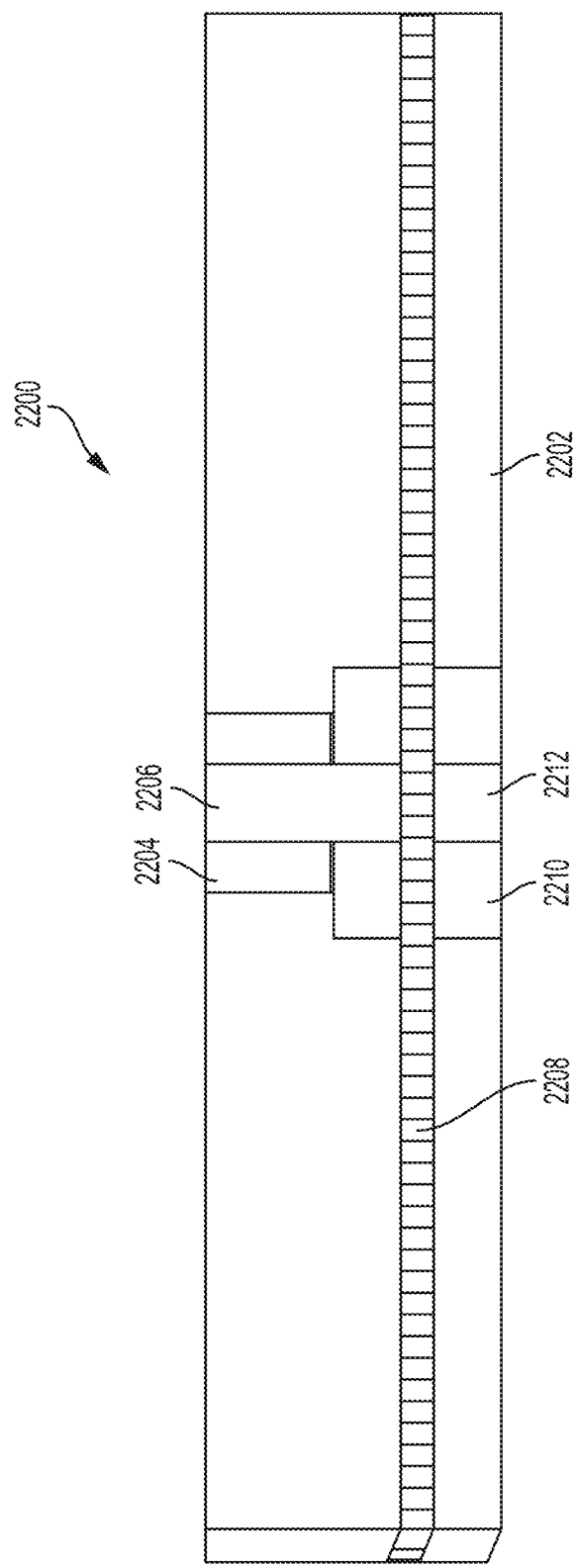
FIG. 22 illustrates an exemplary RF interconnect with PCB or a coaxial cable for a phased array that utilizes an all-metal unit cell according to examples of the disclosure.

FIG. 22 illustrates an exemplary RF interconnect with PCB or a coaxial cable for a phased array that utilizes an all-metal unit cell according to examples of the disclosure. In the example of FIG. 22 the connection between a signal ear and a co-axial cable employing a SMA connector that employs an elastomeric connector is shown. In the example of FIG. 22, a unit cell 2200 can include a base plate 2202, a signal ear post 2206 that is inserted into an airgap 2204 as described above. The airgap 2204 can have a diameter large enough so as to electrically isolate the signal ear post 2206 from the base plate 2202, and can allow the signal ear to extend down into the base plate to make an electrical connection to SMA connector 2210. SMA connector can include a conductive portion 2212. In one or more examples, rather than directly connecting the signal ear post 2206 to the conductive portion 2212 of the SMA connector 2210, an elastomeric conductor 2208 can be inserted between the signal ear post 2206 and SMA connector 2210. The elastomeric conductor 2208, as described above with respect to FIG. 14 can provide a flexible conductive pathway between the signal ear post 2206 and the conductive portion 2212 of SMA connector 2210.

In one or more examples, an elastomeric conductor may not be required and the signal ear post 2206 may be directly mated to the conductive portion 2212 of SMA connector 2210. However, as descried above, without the elastomeric connector the connection between the signal ear post 2206 and the conductive portion 2212 of SMA connector 2210 may be vulnerable to mechanical failure during operation of the phased array and any associated vibration environment incurred by the phased array during operation.

While the example of FIG. 22 illustrates a connection between an SMA connector and the signal ear post 2206, the disclosure should not be construed as limiting and the same configuration of FIG. 22 can be used to connect the signal ear post 2206 with another type of connection such as with a PCB connection.

Furthermore, in one or more examples hollow cylinders of non-conductive material can be inserted into the airgap 2204 to provide precise centering and structural support for the signal ear post 2206 of the signal ear. In one or more examples, the non-conductive material can be composed of Teflon®. The addition of a non-conductive material can help to reduce the risk of mechanical failure of the connection between the signal ear post 2206 and the conductive portion 2212 by dampening any vibration that may occur at the base plate 2202.

As briefly discussed above, configuring a unit cell of a phased array such that the components can be built from a single part, allows for additive manufacturing techniques to be applied when building the phased array. Additive manufacturing can involve joining and adding material together to generate a single component. With respect to the all-metal phased array embodiments described above, the fact that the signal ear, ground ear, and base plate can be built from a single metal part, allows the array to be manufactured using additive manufacturing techniques.

In one or more examples, the all-metal phased array antenna can be manufactured using an additive manufacturing process known as direct metal laser sintering. In a direct laser sintering process, a high-power density laser is steered through a computer generated path, fusing together metal powder to create the phased array parts. In one more examples, the metal powder can comprise $AlSi_{10}Mg$ aluminum alloy powder. When the laser comes into contact with the powder, the portion that comes into contact fuses together to form a metal surface. A computer can steer the laser in a very precise path so as to create all the necessary components for a phased array as a single continuous part.

Figure 23:
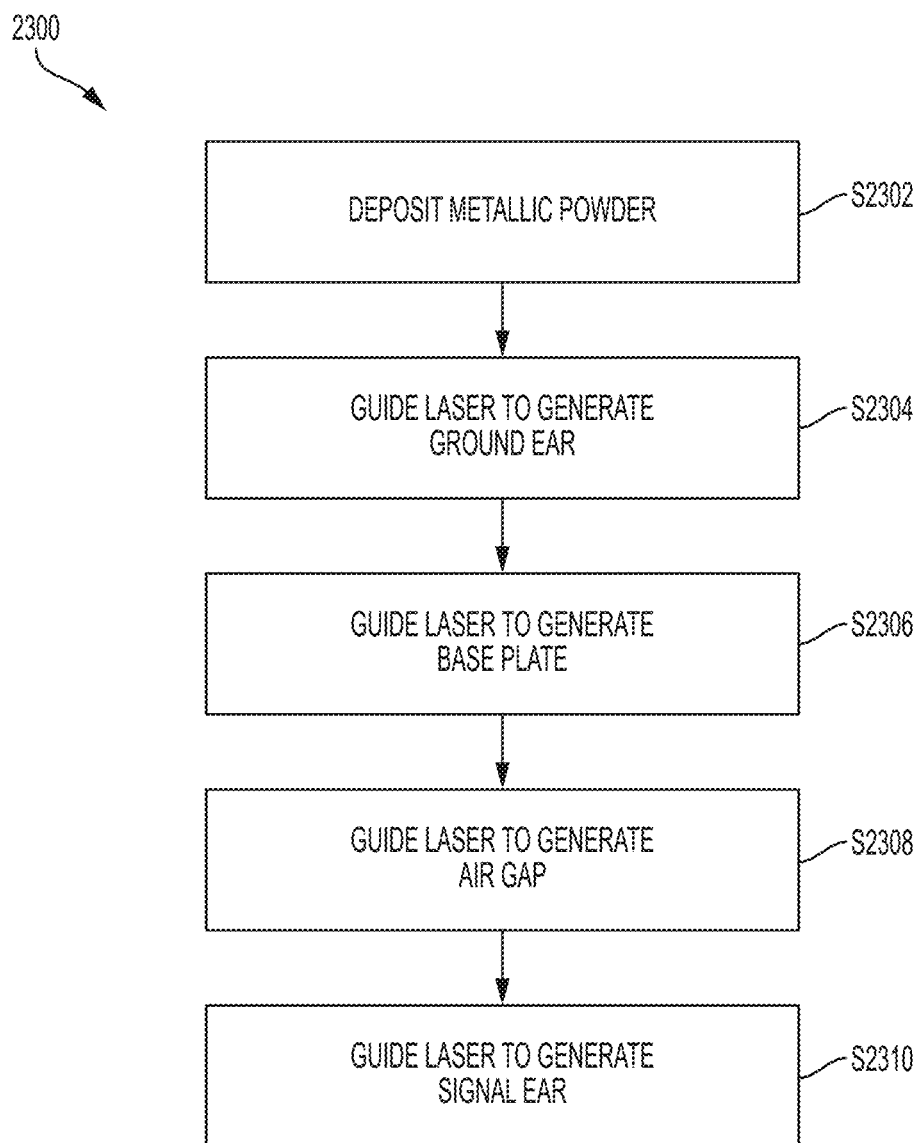
FIG. 23 illustrates an exemplary method for manufacturing an all-metal phased array according to examples of the disclosure

FIG. 23 illustrates an exemplary method for manufacturing an all-metal phased array according to examples of the disclosure. The method 2300 can begin at step 2302 in which a metallic alloy powder can be deposited into a container or deposited on a surface so as to be accessible by a beam of a high power laser. In one or more examples, the laser can be a carbon dioxide laser that can generate a beam with sufficient power so as to fuse together the metallic power upon contact, thereby generating three dimensional shapes.

Once the metallic powder has been deposited, the process can move to step S2304 wherein the laser can be guided in a particular path through the metallic powder to generate the ground ear described above with respect to the all-metal design. At step 2306 the laser can be guided by a computer to generate the base plate, and at step S2308, the laser can further generate an airgap within the base plate so as to accommodate one of the posts from the signal ear as described above. At step S2310, the laser can also be guided to generate the signal ear.

While the above example employs laser sintering, the disclosure should not be seen as limiting, and the phased array described above can be manufactured using other additive manufacturing techniques such as binder jetting, VAT photopolymerization, stereolithogrpahy, power bed fusion, material jetting, sheet lamination, material extrusion, directed energy deposition, or any combination of the above mentioned additive manufacturing techniques.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A phased array antenna comprising:
   a base plate configured to provide a path to ground; and
   a first unit cell comprising:
      a signal ear configured to capacitively couple with a first grounded pillar, wherein the first grounded pillar is connected to the base plate; and
      a ground ear configured to capacitively couple with a signal ear of a second unit cell, wherein no grounded pillar is provided between the ground ear of the first unit cell and the signal ear of the second unit cell.

2. The phased array antenna of claim 1, wherein a ground ear of the second unit cell is configured to capacitively couple with a second grounded pillar connected to the base plate.

3. The phased array antenna of claim 2, wherein the first grounded pillar and second grounded pillar have the same shape.

4. The phased array antenna of claim 2, wherein the first grounded pillar and the second grounded pillar have different shapes.

5. The phased array antenna of claim 1, wherein a signal ear of a third unit cell is configured to capacitively couple with the second grounded pillar and a ground ear of the third unit cell is configured to capacitively couple with a third grounded pillar.

6. The phased array antenna of claim 5, wherein the first unit cell is configured for improved band performance at higher frequency bands and the third unit cell is configured for improved band performance at lower frequency bands.

7. The phased array antenna of claim 1, wherein the base plate and the first unit cell form a single continuous part.

8. The phased array antenna of claim 1, wherein the base plate and the first unit cell are formed using an additive manufacturing process.

9. The phased array antenna of claim 8, wherein the additive manufacturing process includes stereolithography.

10. The phased array antenna of claim 8, wherein the additive manufacturing process includes Vat polymerization.

11. The phased array antenna of claim 1, wherein the base plate comprises an airgap disposed within the base plate.

12. The phased array antenna of claim 11, wherein the signal ear of the first unit cell includes a first post that is connected to the base plate, and wherein the signal ear includes a second post that is disposed within the airgap of the base plate.

13. The phased array antenna of claim 12, wherein the second post of the signal ear is connected to a flexible conductor on a first side of the flexible conductor.

14. The phased array antenna of claim 13, wherein the flexible conductor is connected to a rigid conductor on a second side of the flexible conductor.

15. The phased array antenna of claim 14, wherein the signal ear, the flexible conductor, and the rigid conductor are configured to create an electrical path between the signal ear and the rigid conductor.

16. A method for manufacturing a phased array antenna, the method comprising:
    forming a base plate via additive manufacturing, wherein the base plate is configured to provide a path to ground;
    forming one or more grounded pillars via additive manufacturing;
    forming a first signal ear via additive manufacturing, the signal ear configured to capacitively couple with a first grounded pillar connected to the base plate; and
    forming a ground ear via additive manufacturing, the ground ear configured to capacitively couple with a second signal ear, wherein no grounded pillar is provided between the ground ear the second signal ear.

17. The method of claim 16, wherein a second ground ear is configured to capacitively couple with a second grounded pillar connected to the base plate.

18. The method of claim 17, the method comprising forming the first grounded pillar and second grounded pillar in the same shape.

19. The method of claim 17, the method comprising forming the first grounded pillar in a first shape and forming the second grounded pillar in a second shape different from the first shape.

20. The method of claim 16, wherein a third signal ear is configured to capacitively couple with the second grounded pillar and a third ground ear is configured to capacitively couple with a third grounded pillar.

21. The method of claim 16, the method comprising forming at least one of the base plate, the one or more grounded pillars, the first signal ear, and the ground ear via additive manufacturing includes employing a stereolithography process.

22. The method of claim 16, wherein forming at least one of the base plate, the one or more grounded pillars, the first signal ear, and the ground ear via additive manufacturing includes employing a Vat polymerization process.

23. The method of claim 16, wherein the base plate comprises an airgap disposed within the base plate.

24. The method of claim 23, wherein the first signal ear comprises a first post that is connected to the base plate, and wherein the first signal ear includes a second post that is disposed within the airgap of the base plate.

25. The method of claim 24, the method comprising connecting the second post of the first signal ear to a flexible conductor on a first side of the flexible conductor.

26. The method of claim 25, the method comprising connecting the flexible conductor to a rigid conductor on a second side of the flexible conductor.

27. The method of claim 26, wherein the first signal ear, the flexible conductor, and the rigid conductor are configured to create an electrical path between the first signal ear and the rigid conductor.

* * * * *